United States Patent
Sarker et al.

(10) Patent No.: US 11,530,359 B2
(45) Date of Patent: Dec. 20, 2022

(54) METHODS AND SYSTEMS FOR CONVERTING PLASTIC TO FUEL

(71) Applicant: Waste Technologies, LLC, Bridgeport, CT (US)

(72) Inventors: Moinuddin Sarker, Bridgeport, CT (US); Anjuman Ara Begum, Bridgeport, CT (US)

(73) Assignee: WASTE TECHNOLOGIES, LLC, Bridgeport, CT (US)

( * ) Notice: Subject to any disclaimer, the term of this patent is extended or adjusted under 35 U.S.C. 154(b) by 0 days.

(21) Appl. No.: 17/123,436

(22) Filed: Dec. 16, 2020

(65) Prior Publication Data
US 2021/0363429 A1  Nov. 25, 2021

Related U.S. Application Data

(63) Continuation of application No. PCT/US2019/038442, filed on Jun. 21, 2019.

(60) Provisional application No. 62/688,952, filed on Jun. 22, 2018.

(51) Int. Cl.
*C10G 1/10* (2006.01)
*B01J 19/00* (2006.01)
*C10G 1/02* (2006.01)

(52) U.S. Cl.
CPC ............ *C10G 1/10* (2013.01); *B01J 19/0013* (2013.01); *C10G 1/02* (2013.01); *B01J 2219/00159* (2013.01); *C10G 2300/1003* (2013.01)

(58) Field of Classification Search
USPC ........................................................ 585/241
See application file for complete search history.

(56) References Cited

U.S. PATENT DOCUMENTS

| | | | | |
|---|---|---|---|---|
| 3,901,951 A | * | 8/1975 | Nishizaki | C07C 4/22 585/241 |
| 4,029,550 A | * | 6/1977 | Mitsui | B29B 17/04 201/2.5 |
| 7,626,062 B2 | * | 12/2009 | Carner | C10G 1/10 208/106 |

(Continued)

FOREIGN PATENT DOCUMENTS

WO   WO-2019246504 A1   12/2019

OTHER PUBLICATIONS

PCT/US2019/038442 International Search Report and Written Opinion dated Aug. 30, 2019.

*Primary Examiner* — Nina Bhat
(74) *Attorney, Agent, or Firm* — Wilson Sonsini Goodrich & Rosati

(57) ABSTRACT

A method for producing a vapor stream from waste plastic comprises providing a waste plastic feedstock into a reactor containing one or more residues produced from a previously heated source of waste plastic, and heating the waste plastic feedstock in the reactor to a temperature from about 125° C. to 500° C. to generate a vapor containing one or more hydrocarbons. The waste plastic feedstock can have a calcium to sodium mass ratio from about 0.0001 to 400 as measured by inductively-coupled plasma (ICP) spectrometry. The catalytic activity in the reactor may be provided through one or more constituent elements in the waste plastic feedstock or the one or more residues produced from the previously heated source of waste plastic.

24 Claims, 9 Drawing Sheets

(56) References Cited

U.S. PATENT DOCUMENTS

| | | | |
|---|---|---|---|
| 8,344,195 B2* | 1/2013 | Srinakruang | C10G 1/002 |
| | | | 585/241 |
| 9,725,655 B2 | 8/2017 | Gephart et al. | |
| 2007/0083068 A1* | 4/2007 | Ramesh | C10G 1/10 |
| | | | 585/241 |
| 2008/0099323 A1* | 5/2008 | Kitamura | B29B 17/04 |
| | | | 201/21 |
| 2009/0299110 A1* | 12/2009 | Sarker | C10L 1/04 |
| | | | 585/14 |
| 2009/0321317 A1* | 12/2009 | Widmer | C10G 1/10 |
| | | | 208/113 |
| 2011/0259726 A1* | 10/2011 | Podeszfa | C10B 53/07 |
| | | | 201/30 |
| 2012/0310023 A1* | 12/2012 | Huang | C10G 1/10 |
| | | | 585/241 |
| 2013/0118885 A1* | 5/2013 | Sarker | C10B 47/18 |
| | | | 201/8 |
| 2014/0275667 A1* | 9/2014 | Sarker | C10G 1/10 |
| | | | 585/241 |
| 2015/0080624 A1* | 3/2015 | Gephart | C10G 1/02 |
| | | | 585/241 |
| 2015/0376508 A1 | 12/2015 | Griffiths | |
| 2016/0160127 A1* | 6/2016 | Norena Franco | C10G 1/10 |
| | | | 585/241 |

* cited by examiner

| Name of Element | HDPE Raw Std. Plastic (ppm) | HDPE Raw Waste Plastic (ppm) | LDPE Raw Std. Plastic (ppm) | LDPE Raw Waste Plastic (ppm) | PP Raw Std. Plastic (ppm) | PP Raw Waste Plastic (ppm) | PS Raw Std. Plastic (ppm) | PS Raw Waste Plastic (ppm) |
|---|---|---|---|---|---|---|---|---|
| Silver | <0.001 | <1.0 | <0.001 | <1.0 | <0.001 | <1.0 | <0.001 | <1.0 |
| Aluminum | 0.0993 | 130 | 0.0997 | 197.4 | <0.001 | <1.0 | <0.001 | 59.8 |
| Boron | 0.11916 | <1.0 | 0.0471 | 2.8 | <0.001 | <1.0 | <0.001 | 2.8 |
| Barium | 0.0494 | <1.0 | 0.0426 | <1.0 | 0.2341 | <1.0 | 0.0647 | 2.7 |
| Calcium | 0.8768 | 452.1 | 0.7388 | 962.6 | <0.05 | 30.5 | <0.05 | 33420 |
| Chromium | 0.02 | <1.0 | 0.0237 | <1.0 | 0.0239 | <1.0 | 0.0309 | <1.0 |
| Copper | 0.0039 | <1.0 | 0.0022 | <1.0 | 0.0183 | <1.0 | 0.0288 | <1.0 |
| Iron | <0.001 | 20.3 | <0.001 | 6 | <0.001 | 3.9 | <0.001 | 47.2 |
| Potassium | <0.001 | <1.0 | <0.05 | 35.4 | <0.05 | <1.0 | <0.05 | 28.4 |
| Lithium | <0.001 | <1.0 | <0.001 | <1.0 | <0.001 | <1.0 | <0.001 | 16.8 |
| Magnesium | <0.001 | 15.2 | <0.001 | 25.1 | <0.001 | 2.8 | <0.001 | 842.7 |
| Sodium | 11.218 | 23.4 | 10.181 | 45.2 | 7.5634 | 5966 | 9.652 | 118.8 |
| Nickel | 0.0037 | <1.0 | 0.0043 | <1.0 | 0.0073 | <1.0 | 0.0403 | <1.0 |
| Lead | <0.001 | <1.0 | <0.001 | <1.0 | 0.0042 | <1.0 | 0.0326 | <1.0 |
| Antimony | <0.001 | <1.0 | 0.0025 | <1.0 | 0.0029 | <1.0 | 0.0032 | <1.0 |
| Silicon | <0.001 | 104.2 | <0.001 | 90.2 | <0.001 | 5.3 | <0.001 | 17.2 |
| Tin | <0.001 | <1.0 | <0.001 | <1.0 | <0.001 | <1.0 | <0.001 | <1.0 |
| Titanium | <0.001 | 2.2 | <0.001 | 2.7 | <0.001 | <1.0 | <0.001 | 60.8 |
| Vanadium | 0.0102 | <1.0 | <0.001 | <1.0 | <0.001 | <1.0 | <0.001 | <1.0 |
| Zinc | 0.0085 | 2.2 | 0.0213 | 2.6 | 0.6316 | <1.0 | 0.1938 | 89.9 |

*FIG. 2*

| Name of Element | HDPE Std. Plastic Residue (ppm) | HDPE Waste Plastic Residue (ppm) | LDPE Std. Plastic Residue (ppm) | LDPE Waste Plastic Residue (ppm) | PP Std. Plastic Residue (ppm) | PP Waste Plastic Residue (ppm) | PS Std. Plastic Residue (ppm) | PS Waste Plastic Residue (ppm) |
|---|---|---|---|---|---|---|---|---|
| Silver | <1.0 | <1.0 | <1.0 | <1.0 | <1.0 | <1.0 | <1.0 | <1.0 |
| Aluminum | 189.6 | 11810 | 799.9 | 7806 | 57790 | 4570 | <1.0 | <1.0 |
| Boron | 9.6 | 9.3 | 14.9 | 24.3 | 7.2 | 2701 | <1.0 | 3.9 |
| Barium | 13.2 | 359.3 | 74.8 | 11.4 | 41.9 | 14.2 | <1.0 | <1.0 |
| Calcium | 4599 | 35000 | 2879 | 1041 | 3944 | 16740 | <1.0 | <1.0 |
| Chromium | 19.8 | 33.3 | 51 | 29.2 | 24.6 | 269.6 | <1.0 | <1.0 |
| Copper | 22.2 | 40.3 | 38.7 | 82.4 | 23.5 | 1687 | <1.0 | 3.5 |
| Iron | 1642 | 1596 | 2112 | 4280 | 1229 | 395600 | 17.2 | 219.9 |
| Potassium | <1.0 | 478.9 | <1.0 | 106.7 | <1.0 | <1.0 | <1.0 | 70.5 |
| Lithium | <1.0 | 10.7 | <1.0 | <1.0 | <1.0 | 8.7 | <1.0 | <1.0 |
| Magnesium | 52.3 | 1173 | 125 | 221.6 | 1629 | 4001 | <1.0 | <1.0 |
| Sodium | 42.8 | 1446 | 152.9 | 1201 | 148.6 | 58290 | <1.0 | 303.6 |
| Nickel | 143.7 | 26.3 | 246.7 | 148.7 | 85.2 | 379.6 | <1.0 | 4.9 |
| Lead | <1.0 | <1.0 | <1.0 | 10.8 | 35.6 | 19.2 | <1.0 | <1.0 |
| Antimony | <1.0 | <1.0 | <1.0 | <1.0 | <1.0 | <1.0 | <1.0 | <1.0 |
| Silicon | 11.5 | 35.8 | 33.8 | 77 | 41.3 | 28.2 | <1.0 | 35.4 |
| Tin | 114.7 | 92.5 | 152.7 | 274.3 | 76 | 37520 | <1.0 | <1.0 |
| Titanium | 88.7 | 576.6 | 736.5 | 191.1 | 424.6 | 2674 | <1.0 | <1.0 |
| Vanadium | 79.1 | 8.4 | <1.0 | 17 | <1.0 | <1.0 | <1.0 | <1.0 |
| Zinc | 38.5 | 382.8 | 84.5 | 1617 | 774.4 | 5398 | <1.0 | 86 |

*FIG. 3*

METHODS AND SYSTEMS FOR CONVERTING PLASTIC TO FUEL

CROSS-REFERENCE

The present application is a continuation of International Application No. PCT/US2019/038442, filed Jun. 21, 2019, which claims priority to U.S. Provisional Patent Application Ser. No. 62/688,952, entitled "METHODS AND SYSTEMS FOR CONVERTING PLASTIC TO FUEL", filed on Jun. 22, 2018, each of which are herein incorporated by reference in their entirety for all purposes.

BACKGROUND

Fuel is any material that stores energy that can later be extracted to perform mechanical work in a controlled manner. At least some fuels presently used undergo combustion, a redox reaction in which a combustible substance releases energy after it ignites and reacts with the oxygen in the air. Other processes used to convert fuel into energy include various other exothermic chemical reactions and nuclear reactions, such as nuclear fission or nuclear fusion. Fuels are also used in the cells of organisms in a process known as cellular respiration, where organic molecules are oxidized to release usable energy. Hydrocarbons are the most common source of fuel presently used, but other substances, including radioactive metals, are also utilized.

While there are methods currently available for generating fuel, there are drawbacks to such methods. For instance, methods presently available may require a considerable amount of energy to produce fuel.

SUMMARY

The disclosure provides methods and systems for the conversion of waste plastic to lower molecular weight hydrocarbon materials, particularly valuable hydrocarbon materials such as hydrocarbon fuel materials. Methods and systems of the disclosure provide for the decomposition of hydrocarbon polymers of waste plastics, which can have a high molecular weights (i.e., long carbon-chain lengths), to lower molecular-weight hydrocarbons (i.e., shorter carbon-chain lengths) that may be useful as fuels.

Producing fuel and other valuable low molecular weight hydrocarbon materials from the thermal decomposition of waste plastic may have environmental benefits both with respect to less reliance on traditional fuel production processes that may generate larger amounts of pollution and reduced levels of plastic waste sent to landfills. Fuel production from decomposed waste plastic may also have advantages over other current alternative energy sources, such as for instance crop-plant biomass fuels (bio-fuels) and wind generators. Such alternative energy sources may have drawbacks, including (a) the diversion of crop-producing resources (including arable land) from food production to fuel production, (b) the re-engineering of machinery that is often required in order to run on bio-fuels and (c) the harmful penetration of, for example, equipment into air spaces normally inhabited by wildlife. As an example, the danger of windmills to birds has been well-documented, particularly when windmills are placed along major migratory routes. Economic advantages may also be achieved from an alternative source of hydrocarbon fuels in light of the currently rising costs of hydrocarbon fuels, such as, for example, the significant increase in the cost of gasoline during the last decade.

In an aspect, a system for producing a hydrocarbon-containing vapor stream from waste plastic may comprise: at least one reactor comprising at least one heater; at least one condenser unit fluidly connected to said reactor, wherein said condenser unit is configured to condense a vapor stream containing one or more chemical components from said reactor into one or more liquid streams; and a controller that is configured to use said heater to maintain a temperature of said single reactor to a preset cracking temperature or temperature range to yield said one or more chemical components, wherein the reactor comprises a residue produced from a previously heated plastic feedstock, said residue comprising a calcium to sodium mass ratio from about 0.0001 to 400, as measured by inductively-coupled plasma (ICP) spectrometry. The at least one reactor may comprise a single reactor. The at least one condenser unit may comprise a single condenser unit. The system may further comprise at least one separator unit configured to separate the one or more chemical components. The system may further comprise at least one storage tank configured to store the one or more chemical components. The reactor may comprise at least one access port configured to allow the waste plastic to be loaded into the reactor. The access port may be configured to accept at least one loading hopper to allow the waste plastic to be loaded into the reactor. The condenser unit may be fluidly connector the reactor via a pipe. The pipe may comprise a first end coupled to the reactor with a first connector and a second end coupled to the condenser unit with a second connector. The first and second connectors may comprise glass fittings. The system may further comprise at least one water jacket coupled to the pipe and configured to cool the pipe.

In another aspect, a method for producing a hydrocarbon-containing vapor stream from waste plastic may comprise: using at least one controller to (i) control a heater to maintain a preset cracking temperature or temperature range of at least one reactor to yield one or more chemical components; and (ii) control at least one condenser unit to condense a vapor stream containing the one or more chemical components into one or more liquid streams, wherein the reactor comprises a residue produced from a previously heated plastic feedstock, the residue comprising a calcium to sodium mass ratio from about 0.0001 to 400, as measured by inductively-coupled plasma (ICP) spectrometry. The method may further comprise separating the one or more chemical components using at least one separator unit. The method may further comprise storing the one or more chemical components in at least one storage tank. The method may further comprise loading the waste plastic into the reactor through at least one access port of the reactor.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the disclosure will be obtained by reference to the following detailed description that sets forth illustrative embodiments, in which the principles of the invention are utilized, and the accompanying drawings of which:

FIG. 2 provides an example metal elemental analysis of waste plastic feedstocks for several common types of plastic found in waste plastics. As a reference, the elemental composition of a standard source (e.g., high purity plastic obtained from a chemical supply company) of each type of plastic analyzed is shown.

FIG. 3 provides an example metal elemental analysis for a residue generated from heated waste plastic feedstocks that are comprised of a single type of plastic. As a reference, the elemental composition of a residue generated from a standard source (e.g., high purity plastic obtained from a chemical supply company) of each type of analyzed plastic is shown.

DETAILED DESCRIPTION

Figure 1:
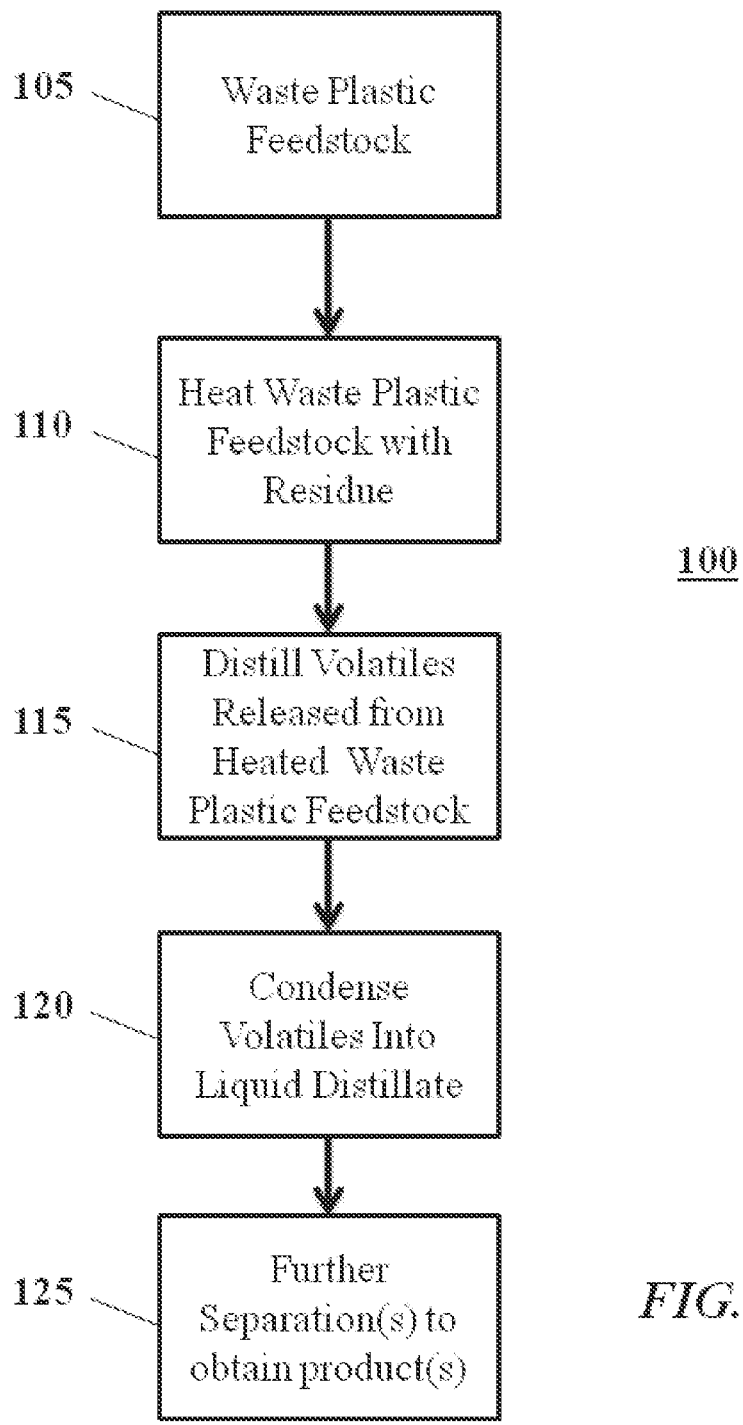
FIG. 1 schematically illustrates a method for generating volatiles from waste plastic.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," "less than or equal to," or "at most" precedes the first numerical value in a series of two or more numerical values, the term "no more than," "less than," "less than or equal to," or "at most" applies to each of the numerical values in that series of numerical values. For example, less than or equal to 3, 2, or 1 is equivalent to less than or equal to 3, less than or equal to 2, or less than or equal to 1.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

The term "plastic," as used herein, generally refers to a polymeric material, made in whole, or part, of at least one hydrocarbon, that may contain one or more modifications and/or may be compounded with an additive (e.g., colorants, plasticizers, etc.) to form a useful material. Non-limiting examples of plastics include polyamides (PA), polycarbonates (PC), polyesters (PES), polyethylene (PE), high-density polyethylene (HDPE), low-density polyethylene (LDPE), polyethylene terephthalate (PET), polypropylene (PP), polystyrene (PS), high impact polystyrene (HIPS), polyurethanes (PU), polyvinyl chloride (PVC), polyvinylidene chloride (PVDC), acrylonitrile butadiene styrene (ABS), polyepoxides, polymethyl methylacrylate (PMMA), polytetrafluoroethylene (PTFE), phenol formaldehyde (PF), melamine formaldehyde (MF), urea-formaldehyde (UF), polyetheretherketone (PEEK), polyetherimide (PEI), polyimides, polylactic acid (PLA), furans, silicones, polysulfones, polydiketoenamine, and any combinations thereof.

The term "waste plastic," as used herein, generally refers to a post-consumer plastic that is no longer needed for its intended purpose. Waste plastics may be generated from a range of consumer products. An example of a waste plastic is high density polyethylene (HDPE) that is a material component of an empty, one-gallon milk container.

The term "waste plastic feedstock," as used herein, generally refers to an aggregate of waste plastic that may be processed to generate additional useful materials. A non-limiting example of a waste plastic feedstock include empty, one-gallon milk containers, such as a lot of 100 empty, one-gallon milk containers comprised of high-density polyethylene (HDPE).

The term "thermal decomposition," as used herein, generally refers to a process in which higher molecular-weight polymeric materials may be broken down into materials of lower molecular-weight with sustained heating or heating at increasing temperature. An example of thermal decomposition is the heating of a waste plastic feedstock to produce lower molecular-weight materials.

The term "residue," as used herein, generally refers to residual material, comprised, at least in part, of hydrocarbons and/or materials of a waste plastic feedstock, which do not volatilize during thermal decomposition of a waste plastic feedstock.

The term "lower molecular-weight hydrocarbon," as used herein, generally refers to a hydrocarbonaceous species of lower carbon-chain length that is produced by thermally decomposing a hydrocarbonaceous species of higher carbon-chain length. An example of a lower molecular-weight hydrocarbon is octane produced from the thermal decomposition of a waste plastic feedstock comprised of higher molecular-weight hydrocarbonaceous materials.

The term "external catalyst," as used herein, generally refers to a material that speeds-up the kinetics of waste plastic feedstock thermal decomposition without being consumed or undergoing a permanent chemical change. The external catalyst may not be a material component of a waste plastic feedstock being heated, a residue generated from a previously heated waste plastic feedstock that is heated with the waste plastic feedstock being heated, or any apparatus or device used to contain a waste plastic feedstock and/or residue during heating. An example of an external catalyst is a noble metal on a support that is added to a reactor to facilitate a chemical reaction.

The term "internal catalyst," as used herein, generally refers to a material that speeds-up the kinetics of waste plastic feedstock thermal decomposition without being consumed or undergoing a permanent chemical change. The internal catalyst may be a material component of a waste plastic feedstock being heated, a residue generated from a previously heated waste plastic feedstock that is heated with the waste plastic feedstock being heated, or any apparatus or device used to contain a waste plastic feedstock and/or residue during heating. An example of an internal catalyst is a noble metal that is a material component of a waste plastic feedstock that is entered into a reactor.

The term "chemical additive," as used herein, generally refers to an agent that improves thermal decomposition, either catalytically or non-catalytically. In some cases, a chemical additive may also be an external catalyst. An example of a chemical additive is calcium hydroxide.

The term "optimum temperature," as used herein, generally refers to a temperature or temperature range at which maximum levels of hydrocarbonaceous distillate may be obtained during thermal decomposition of a waste plastic feedstock.

The term "mass conversion," as used herein, generally refers to the ratio of the mass of liquid lower molecular-weight hydrocarbon distillate recovered during thermal decomposition of a waste plastic feedstock to the mass of waste plastic feedstock entered into the reactor multiplied by one hundred percent.

The present disclosure provides methods and systems for the conversion of waste plastic to lower molecular-weight hydrocarbon materials, such as, for example, valuable hydrocarbon materials such as hydrocarbon fuel materials. The present disclosure provides systems and methods for the decomposition of hydrocarbon polymers of waste plastics, which have high molecular-weights (i.e., long carbon-chain lengths), to lower molecular-weight hydrocarbons (i.e., shorter carbon-chain lengths), particularly those useful as fuels.

FIG. 1 shows a process flow diagram for a method 100 that comprises the steps of: (a) entering a waste plastic feedstock into a reactor 105; (b) heating, at increasing temperature and in the presence of a residue generated from a previously heated waste plastic feedstock, a waste plastic feedstock to induce thermal decomposition of the waste plastic feedstock 110; (c) distillation of volatilized lower molecular-weight hydrocarbons that may be released from thermal decomposition of the waste plastic feedstock 115; (d) condensation of a lower molecular-weight hydrocarbon vapor stream formed from the volatilization 120; and, optionally, (f) further refinement of the liquid distillate by one or more separation techniques 125. In some situations, thermal decomposition of hydrocarbon polymers is effected without the use of an external catalyst. Instead, waste plastics and/or residues generated from them may contain a host of metals in addition to hydrocarbon polymers. One or more of such metals of a waste plastic feedstock and/or a residue may serve as an internal catalyst for thermal decomposition of the waste plastic feedstock during heating. Metals of any apparatus or device used to contain a waste plastic feedstock and/or residue may also participate in thermal decomposition catalysis.

The disclosure also provides systems that may be utilized to execute methods provided by the disclosure. In general, systems of the disclosure are broadly comprised of a) at least one reactor that contains a residue generated from at least one previously heated waste plastic feedstock; b) at least one heating source; and c) at least one condenser.

Waste Plastics

Waste plastic may be generated from a range of consumer products. In a non-limiting example, a waste plastic may be generated from a post-consumer plastic container with non-limiting examples that include: food storage containers, food storage wrappers, personal hygiene product containers, beauty product containers, household chemical containers, personal hygiene chemical containers, automotive chemical containers, plastic bags, and waste receptacles. Other non-liming examples of a waste plastic include post-consumer plastic food utensils, plastic product packaging devices, plastic automotive components, electrical component casings (e.g., computer body, electrical cable casings), tires (including rubber tires), personal protective equipment (e.g. protective gloves), plastic toys, plastic household furnishings, and plastic piping. As a waste plastic is considered refuse, common non-limiting examples of establishments from which a waste plastic may be obtained include a private or public waste processing facility, a private or public landfill, a household, a place-of-business, an eating establishment, an automotive, aircraft, or ship salvage yard, or a private or public recycling center.

A waste plastic may be comprised of a thermoplastic or a thermoset polymer. Thermoplastic polymers may be resilient species that may become pliable and moldable at higher temperatures, yet return to the same solid state of the material prior to heating when cooled. Thermoplastics may be higher molecular-weight (e.g., long polymer chains) materials whose chains associate through non-covalent intermolecular forces (e.g., Van der Waals forces, hydrophobic interactions, etc.). Moreover, the polymer chains of a thermoplastic may be linear or slightly branched in shape. The strength of interchain interactions is reduced during heating, and regained during cooling, permitting a return to the solid state of the material prior to heating. In contrast, thermoset polymers may undergo a chemical change when they are heated, and cannot be returned to their pre-heated solid state. The irreversible nature of a thermoset after heating is due to intermolecular covalent bonds that form between polymer chains during heating.

Methods provided herein may be executed with most types of waste plastic feedstocks. A waste plastic feedstock utilized in methods provided herein may be comprised of a single type of waste plastic or may be comprised of a combination of two or more types of waste plastic. Non-limiting examples of the types of plastic that may be found in a waste plastic feedstock include thermoplastic polymers, thermoset polymers, low-density polyethylene (LDPE), high-density polyethylene (HDPE), polypropylene (PP), polystyrene (PS), polyethylene terephthalate (PETE), polyvinyl chloride (PVC), synthetic rubber, natural rubber, and combinations thereof. Several of these example plastics have been classified by the American Plastic Council for aiding in plastic identification during recycling processes. Code 1 identifies PETE, with non-limiting examples of its use that include beverage containers and waterproof packaging. Code 2 identifies HDPE, with non-limiting examples of its use that include milk, detergent and oil bottles, toys, and plastic bags. Code 3 identifies vinyl/polyvinyl chloride (PVC), with non-limiting examples of its use that include food wrap, vegetable oil bottles, blister packages, and piping. Special considerations must be given to PVC as it contains bonded chlorine atoms which, upon degradation of the polymer, must be separated and handled according to material safety protocols. Code 4 is LDPE, with non-limiting examples of its use that include plastic bags, shrink wrap, and garment bags. Code 5 is PP, with non-limiting examples of its use that include refrigerated containers, plastic bags, bottle tops, carpets and food wraps. Code 6 is PS, which is often used for disposable utensils, meat packing, Styrofoam, and protective packing materials. Code 7 describes "other" plastics (i.e., those not described with codes 1-6), with non-limiting examples that include layered plastic, mixed plastic, polycarbonate (PC), and acrylonitrile-butadiene-styrene (ABS). While the plastic numbering system may be readily recognized by consumers and waste processing professionals alike, a great number of additional plastic types exist beyond those identified by the numbering system and may also be considered useful in methods of the disclosure.

Waste plastics may be generally classified by the primary polymer or polymers of which they may be comprised. Like most other materials, however, waste plastics may also contain additional chemical species that may include plastic additives to enhance mechanical properties (e.g., tensile strength, stiffness, etc.) or alter cosmetic appearance (e.g., colorants). Waste plastics may also contain unintended impurities that may include trace or bulk quantities of a metal. Such impurities may be impregnated into a waste plastic material, for example, during manufacturing of the plastic material. Alternatively, as another example, impurities may have been impregnated or adhered to a waste plastic material by contaminant mixing events that occur at a waste processing or recycling facility after waste collection.

FIG. 2 shows an example elemental analysis, which is conducted via inductively coupled plasma optical emission spectroscopy (ICP-OES) and probes a panel of metal elements, for several types (e.g., HDPE, LDPE, PP, and PS) of waste plastic. Standard samples of plastic (i.e., a high purity sample of a respective plastic obtained directly from a chemical supply company) are also tested as a reference. It is evident from FIG. 2 that each type of plastic tested is comprised, in part, of metals and that samples that originate in a waste plastic may be comprised of higher levels of metals than their high-purity, standard counterparts.

As a residue is, at least in part, comprised of materials that once comprised a waste plastic feedstock, the residue may contain some of the same additive materials or unintended impurities (e.g., metals) that may be detected in a waste plastic feedstock. FIG. 3 shows an example elemental analysis, which is conducted via inductively coupled plasma optical emission spectroscopy (ICP-OES) and probes a panel of metal elements, for several residues generated from heating several types (e.g., HDPE, LDPE, PP, and PS) of waste plastic. Residues generated from standard samples of plastic (i.e., a high purity sample of a respective HDPE plastic obtained directly from a chemical supply company) are also tested as a reference. It is evident from FIG. 3 that each type of residue tested is comprised of metals and that residues that originate from a waste plastic may be comprised of higher levels of metals than residues from higher-purity standards.

Non-limiting examples of metals that may, at least in part, be a component of a waste plastic feedstock or a residue and may be measurable by ICP-OES include: aluminum, antimony, arsenic, barium, beryllium, bismuth, boron, cadmium, calcium, cesium, chromium, cobalt, copper, gallium, germanium, gold, hafnium, indium, iron, lead, lithium, magnesium, manganese, mercury, molybdenum, nickel, platinum, palladium, potassium, rhodium, iridium, osmium, ruthenium, rhenium, rubidium, scandium, selenium, silicon, silver, sodium, strontium, tantalum, tellurium, thallium, thorium, tin, titanium, tungsten, vanadium, zinc, zirconium, or combinations thereof.

In some instances, a waste plastic feedstock or residue may be comprised of any or all of following elements: aluminum, antimony, arsenic, barium, beryllium, bismuth, boron, cadmium, calcium, cesium, chromium, cobalt, copper, gallium, germanium, gold, hafnium, indium, iron, lead, lithium, magnesium, manganese, mercury, molybdenum, nickel, platinum, palladium, potassium, rhodium, iridium, osmium, ruthenium, rhenium, rubidium, scandium, selenium, silicon, silver, sodium, strontium, tantalum, tellurium, thallium, thorium, tin, titanium, tungsten, vanadium, zinc, and zirconium. In some examples, a waste plastic feedstock or residue may be comprised of at least about one of the above elements. In some examples, a waste plastic feedstock or residue may be comprised of at least about two of the above elements. In some examples, a waste plastic feedstock or residue may be comprised of at least about three of the above elements. In some examples, a waste plastic feedstock or residue may be comprised of at least about four of the above elements. In some examples, a waste plastic feedstock or residue may be comprised of at least about five of the above elements. In some examples, a waste plastic feedstock or residue may be comprised of at least about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more of the above elements. In some examples, a waste plastic feedstock or residue may be comprised of at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more of the following elements: aluminum, antimony, arsenic, barium, beryllium, bismuth, boron, cadmium, calcium, cesium, chromium, cobalt, copper, gallium, germanium, gold, hafnium, indium, iron, lead, lithium, magnesium, manganese, mercury, molybdenum, nickel, platinum, palladium, potassium, rhodium, iridium, osmium, ruthenium, rhenium, rubidium, scandium, selenium, silicon, silver, sodium, strontium, tantalum, tellurium, thallium, thorium, tin, titanium, tungsten, vanadium, zinc, and zirconium. In some examples, a waste plastic feedstock or residue may be comprised of at most about 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 of the above elements. In some examples, a waste plastic feedstock or residue may be comprised of at most about 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 the following elements: aluminum, antimony, arsenic, barium, beryllium, bismuth, boron, cadmium, calcium, cesium, chromium, cobalt, copper, gallium, germanium, gold, hafnium, indium, iron, lead, lithium, magnesium, manganese, mercury, molybdenum, nickel, platinum, palladium, potassium, rhodium, iridium, osmium, ruthenium, rhenium, rubidium, scandium, selenium, silicon, silver, sodium, strontium, tantalum, tellurium, thallium, thorium, tin, titanium, tungsten, vanadium, zinc, and zirconium.

In some situations, a waste plastic feedstock may contain levels, measurable by ICP-OES, of the metals calcium and sodium. In some examples, the mass ratio of calcium to sodium in a waste plastic feedstock may be at least about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900, 1,000, or more. In some examples, the mass ratio of calcium to sodium in a waste plastic feedstock may be at most about 1,000, 900, 800, 700, 600, 500, 400, 300, 200, 100, 90, 80, 70, 60, 50, 40, 30, 20, 10, 9, 8, 7, 6, 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.009, 0.008, 0.007, 0.006, 0.005, 0.004, 0.003, 0.002, 0.001, 0.0009, 0.0008, 0.0007, 0.0006, 0.0005, 0.0004, 0.0003, 0.0002, 0.0001, or less. In some examples, the mass ratio of calcium to sodium in a waste plastic feedstock may be from about 0.0001 to 400. In some examples, the mass ratio of calcium to sodium in a waste plastic feedstock may be from about 0.005 to 400. In some examples, the mass ratio of calcium to sodium in a waste plastic feedstock may be from about 0.005 to 280. In some examples, the mass ratio of calcium to sodium in a waste plastic feedstock may be from about 0.0001 to 4. In some examples, the mass ratio of calcium to sodium in a waste plastic feedstock may be from about 0.0001 to 0.04. In some examples, the mass ratio of calcium to sodium in a waste plastic feedstock may be from about 0.0001 to 0.04, 0.0001 to 0.4, 0.0001 to 4, 0.0001 to 40, or 0.0001 to 400. In some examples, the mass ratio of calcium to sodium in a waste plastic feedstock may be about 0.00001 to 1000, 0.0001 to 400, or 0.001 to 4. In some examples, the mass ratio of calcium to sodium in a waste plastic feedstock may be about 0.0001 to 1000, 0.0001 to 100, 0.0001 to 10, 0.0001 to 1, 0.0001 to 0.1, 0.0001 to 0.01, or 0.0001 to 0.001.

In some examples, a residue may contain levels, measurable by ICP-OES, of the metals calcium and sodium. In some examples, the mass ratio of calcium to sodium in a residue may be from about 0.0001 to 400. In some examples, the mass ratio of calcium to sodium in a residue may be from about 0.005 to 400. In some examples, the mass ratio of calcium to sodium in a residue may be from about 0.005 to 280. In some examples, the mass ratio of calcium to sodium in a residue may be from about 0.0001 to 4. In some examples, the mass ratio of calcium to sodium in a residue may be from about 0.003 to 40. In some examples, the mass ratio of calcium to sodium in a residue may be from about 0.003 to 4. In some examples, the mass ratio of calcium to sodium in a residue may be from about 0.0001 to 0.04. In some examples, the mass ratio of calcium to sodium in a residue may be from about 0.0001 to 0.04, 0.0001 to 0.4, 0.0001 to 4, 0.0001 to 40, or 0.0001 to 400. In some examples, the mass ratio of calcium to sodium in a residue may be from about 0.0001 to 1000, 0.0001 to 100, 0.0001 to 10, 0.0001 to 1, 0.0001 to 0.1, 0.0001 to 0.01, or 0.0001 to 0.001.

Methods

Figure 4:
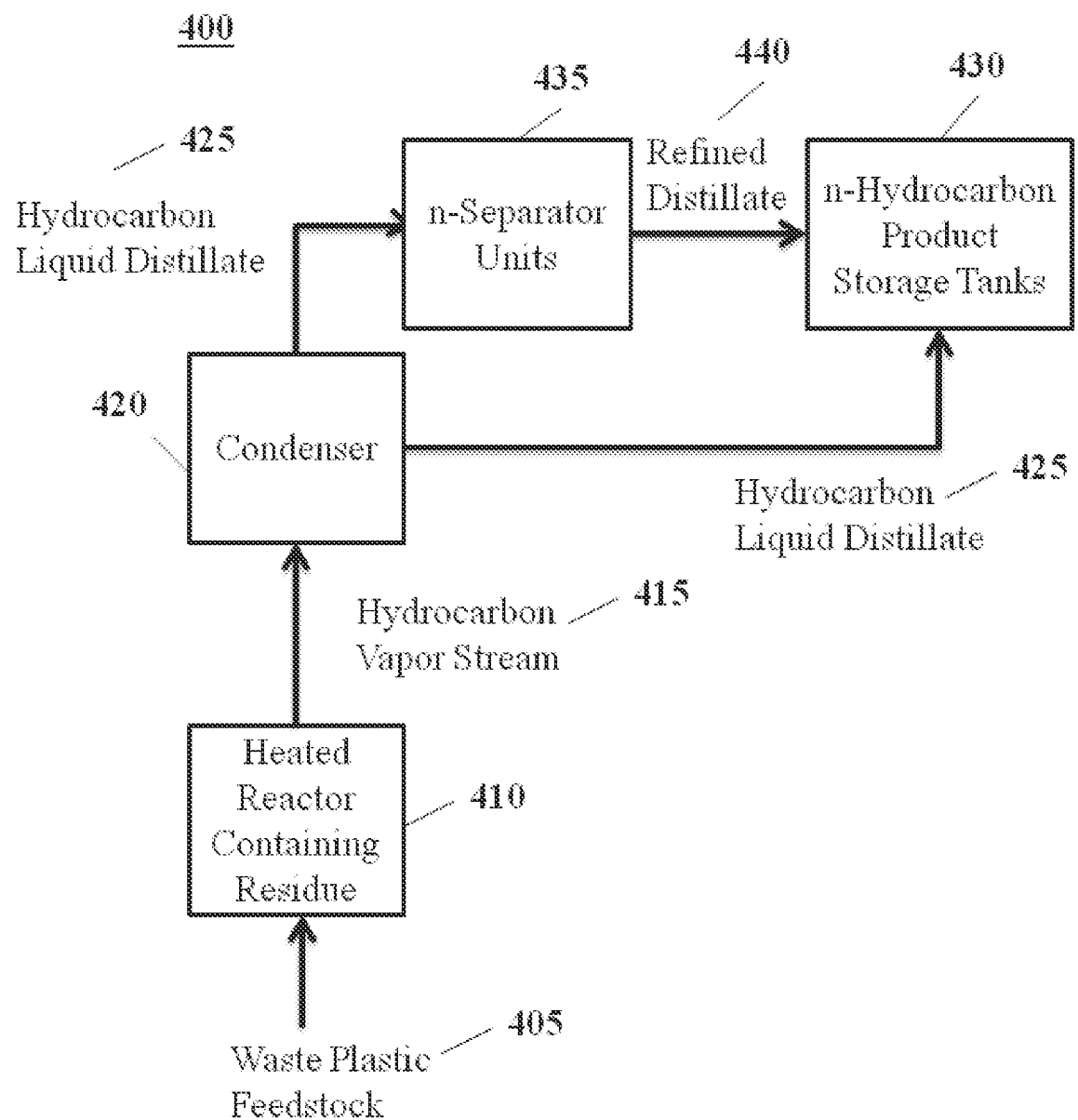
FIG. 4 schematically illustrates the process-flow of an example method of the disclosure that is executed in batch mode.

The disclosure provides methods to obtain a hydrocarbonaceous species or mixture of hydrocarbonaceous species from thermal decomposition of at least one waste plastic feedstock. At least one metal internal catalyst (e.g., metal that is a component of a waste plastic feedstock, metal that is a component of a residue, or metal that is a component of any apparatus used to execute methods of the disclosure) may serve as a catalytic agent during a thermal decomposition process. In some situations, no external catalyst is used. A process flow diagram for an example method 400 of the disclosure is shown in FIG. 4. In the example method 400, a waste plastic feedstock 405 may be provided to a reactor that contains a residue 410 and is sealed. Residue may already be present, due to its build-up in the reactor over several cycles of waste plastic feedstock heating. The reactor may be heated to increasingly higher temperatures throughout a given reaction time. As heating occurs, the waste plastic feedstock may be liquefied and thermally decomposed, where internal catalysts may serve as catalysts. Some lower molecular-weight hydrocarbons that may be generated during decomposition may volatilize and distill off the liquefied waste plastic feedstock to form a hydrocarbon vapor stream 415. The hydrocarbon vapor stream 415, containing at least one lower molecular-weight hydrocarbon, may then be condensed in a condenser 420 to a hydrocarbon liquid distillate 425 and may be either directed to at least one product storage tank 430 for recovery of the hydrocarbon liquid distillate 425 or, first, may be directed to one or more downstream separation unit operations 435 to obtain a further refined distillate 440 that may then be directed to at least one product storage tank 430 for further use.

Figure 5:
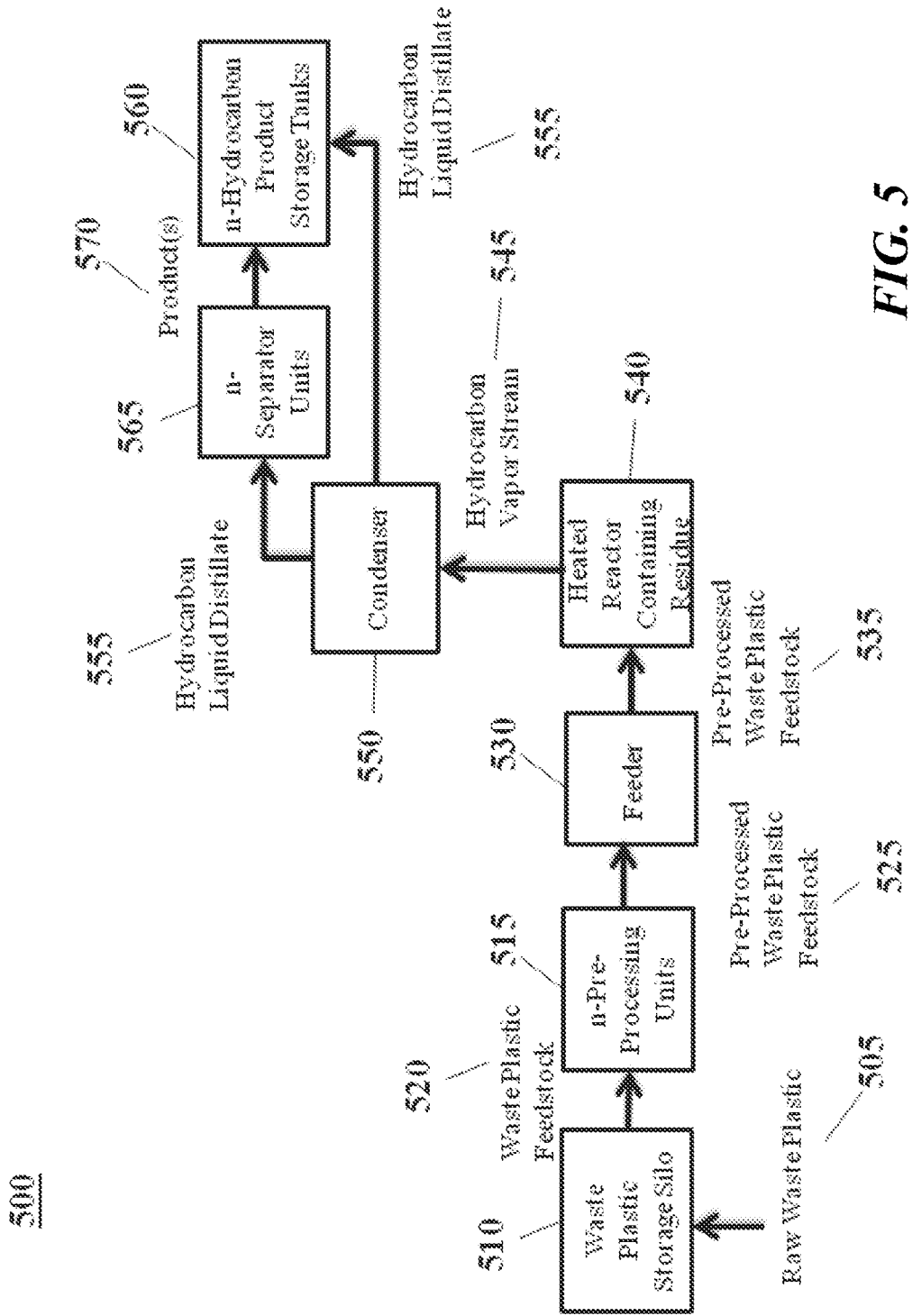
FIG. 5 schematically illustrates the process-flow of an example method of the disclosure that is executed in continuous mode.

A process flow diagram for another example method 500 of the disclosure is shown in FIG. 5. In the example method 500, raw waste plastic 505 may be entered into a waste plastic storage silo 510 that supplies at least one pre-processing unit operation (e.g., cleaning unit operation, size reduction unit operation) 515 with waste plastic feedstock 520. The pre-processed waste plastic feedstock 525 may then be sent to a feeder 530 that provides waste plastic feedstock 535 to a reactor 540 that contains residue. Residue may already be present, due to its build-up in the reactor over several cycles of waste plastic feedstock heating. The reactor may be heated to increasingly higher temperatures throughout a given reaction time. As heating occurs, the waste plastic feedstock may be liquefied and thermally decomposed, where internal catalysts may serve as catalysts. Some lower molecular-weight hydrocarbons that may be generated during decomposition may volatilize and distill off the liquefied waste plastic feedstock to form a hydrocarbon vapor stream 545. The vapor stream 545, containing at least one lower molecular-weight hydrocarbon, may then be condensed in a condenser 550 to a hydrocarbon liquid distillate 555 and may be either directed to at least one product storage tank 560 for recovery of the hydrocarbon liquid distillate 555 or, first, may be directed to one or more downstream separation unit operations 565 to obtain a further refined distillate 570 that is then directed to at least one product storage tank 560 for further use.

The example methods 400 and 500 shown in FIG. 4 and FIG. 5 respectively are examples and may not include method components necessary for executing a particular method of the disclosure. Non-limiting examples of such components include method parameters, materials utilized, consumed, or generated in the method, method process types, method completion times, arrangement of method components, and method efficiencies. Such components are further specified in the paragraphs that follow.

In some examples, the disclosure provides methods that can be executed in batch mode. In batch mode, a waste plastic feedstock bolus (or "batch") may be thermally decomposed, all-at-once, in a discrete cycle of the process. Additional waste plastic boluses may be thermally decomposed in non-continuous, separate method cycles.

In some examples, the disclosure provides methods that can be executed in continuous mode. In continuous mode, waste plastic feedstock may be continuously fed to a reactor and heated, with continuous generation of lower molecular-weight hydrocarbon vapor streams, continuous subsequent condensation of the vapor stream into a liquid distillate, and, optionally, continuous separation processing of the distillate. Unlike batch mode, continuous processes generally do not involve discrete method cycles.

Methods of the disclosure utilize waste plastic feedstocks to produce valuable, lower molecular-weight hydrocarbons. In some examples, methods of the disclosure may utilize a waste plastic feedstock may be comprised of a single type of waste plastic. In some examples, a waste plastic feedstock may be comprised of a select assortment of at least two types of waste plastic, in select ratios or in random ratios. In some examples, a waste plastic feedstock may be comprised of a random assortment of at least two types of waste plastic, wherein the types and/or ratios of waste plastic in the waste plastic feedstock are known or unknown.

Methods of disclosure may be comprised of one or more pre-processing methods. Pre-processing methods generally involve the processing of raw waste plastic and/or a waste plastic feedstock prior to the entry of a resulting waste plastic feedstock into a reactor for thermal decomposition. Non-limiting examples of pre-processing include collection processes (e.g., storage of plastic materials in a storage vessel), sorting processes (e.g., by size, by plastic type, by weight, etc.), size reduction processes (e.g., grinding, shredding, extruding, pulverizing, pelletizing, granulizing, cutting), cleaning processes (e.g., washing, magnetic separation), drying processes (e.g., to remove adhered liquids), or weighing processes (e.g., to weigh materials utilized, generated, or consumed). Moreover, one or more of the pre-processing methods mentioned above may be included downstream of a thermal decomposition process, for post-processing of a material.

Methods of the disclosure generally involve the decomposition of a waste plastic feedstock with increasing temperature. In some examples, the temperature, at any given time, in a reactor wherein waste plastic feedstock is thermally decomposed is at least about 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C., 305° C., 310° C., 315° C., 320° C., 325° C., 330° C., 335° C., 340° C., 345° C., 350° C., 355° C., 360° C., 365° C., 370° C., 375° C., 380° C., 385° C., 390° C., 395° C., 400° C., 405° C., 410° C., 415° C., 420° C., 425° C., 430° C., 435° C., 440° C., 445° C., 450° C., 455° C., 460° C., 465° C., 470° C., 475° C., 480° C., 485° C., 490° C., 495° C., 500° C., 505° C., 510° C., 515° C., 520° C., 525° C., 530° C., 535° C., 540° C., 545° C., 550° C., 555° C., 560° C., 565° C., 570° C., 575° C., 580° C., 585° C., 590° C., 595° C., 600° C., 605° C., 610° C., 615° C., 620° C., 625° C., 630° C., 635° C., 640° C., 645° C., 650° C., 655° C., 660° C., 665° C., 670° C., 675° C., 680° C., 685° C., 690° C., 695° C., 700° C., 705° C., 710° C., 715° C., 720° C., 725° C., 730° C., 735° C., 740° C., 745° C., 750° C., 755° C., 760° C., 765° C., 770° C., 775° C., 780° C., 785° C., 790° C., 795° C., 800° C., 805° C., 810° C., 815° C., 820° C., 825° C., or more. In some examples, the temperature, at any given time, in a reactor wherein waste plastic feedstock is thermally decomposed is at most about 825° C., 820° C., 815° C., 810° C., 805° C., 800° C., 795° C., 790° C., 785° C., 780° C., 775° C., 770° C., 765° C., 760° C., 755° C., 750° C., 745° C., 740° C., 735° C., 730° C., 725° C., 720° C., 715° C., 710° C., 705° C., 700° C., 695° C., 690° C., 685° C., 680° C., 675° C., 670° C., 665° C., 660° C., 655° C., 650° C., 645° C., 640° C., 635° C., 630° C., 625° C., 620° C., 615° C., 610° C., 605° C., 600° C., 595° C., 590° C., 585° C., 580° C., 575° C., 570° C., 565° C., 560° C., 555° C., 550° C., 545° C., 540° C., 535° C., 530° C., 525° C., 520° C., 515° C., 510° C., 505° C., 500° C., 495° C., 490° C., 485° C., 480° C., 475° C., 470° C., 465° C., 460° C., 455° C., 450° C., 445° C., 440° C., 435° C., 430° C., 425° C., 420° C., 415° C., 410° C., 405° C., 400° C., 395° C., 390° C., 385° C., 380° C., 375° C., 370° C., 365° C., 360° C., 355° C., 350° C., 345° C., 340° C., 335° C., 330° C., 325° C., 320° C., 315° C., 310° C., 305° C., 300° C., 295° C., 290° C., 285° C., 280° C., 275° C., 270° C., 265° C., 260° C., 255° C., 250° C., 245° C., 240° C., 235° C., 230° C., 225° C., 220° C., 215° C., 210° C., 205° C., 200° C., 195° C., 190° C., 185° C., 180° C., 175° C., 170° C., 165° C., 160° C., 155° C., 150° C., 145° C., 140° C., 135° C., 130° C., 125° C., 120° C., 115° C., 110° C., 105° C., 100° C., or less. In some examples, the temperature, at any given time, in a reactor wherein waste plastic feedstock is thermally decomposed is from about 125° C. to 800° C. In some examples, the temperature, at any given time, in a reactor wherein waste plastic feedstock is thermally decomposed is from about 125° C. to 700° C. In some examples, the temperature, at any given time, in a reactor wherein waste plastic feedstock is thermally decomposed is from about 125° C. to 600° C. In some examples, the temperature in a reactor, at any given time, is from about 125° C. to 500° C. In some examples, the temperature, at any given time, in a reactor wherein waste plastic feedstock is thermally decomposed is from about 150° C. to 500° C. In some examples, the temperature, at any given time, in a reactor wherein waste plastic feedstock is thermally decomposed is from about 150° C. to 450° C. In some examples, the temperature, at any given time, in a reactor wherein waste plastic feedstock is thermally decomposed is from about 150° C. to 425° C. In some examples, the temperature in a reactor, at any given time, is from about 150° C. to 400° C. In some examples, the temperature in a reactor, at any given time, is from about 125° C. to 375° C. In some examples, the temperature in a reactor, at any given time, is from about 125° C. to 175° C., 175° C. to 225° C., 225° C. to 275° C., 275° C. to 325° C., 325° C. to 375° C., 375° C. to 425° C., 425° C. to 525° C., 525° C. to 625° C., or 625° C. to 825° C.

In some examples, the temperature ramp rate, at any given time, in a reactor wherein waste plastic feedstock is thermally decomposed is at least about 0.1° C./min, 0.2° C./min, 0.3° C./min, 0.4° C./min, 0.5° C./min, 0.6° C./min, 0.7° C./min, 0.8° C./min, 0.9° C./min, 1° C./min, 1.1° C./min, 1.2° C./min, 1.3° C./min, 1.4° C./min, 1.5° C./min, 1.6° C./min, 1.7° C./min, 1.8° C./min, 1.9° C./min, 2° C./min, 2.1° C./min, 2.2° C./min, 2.3° C./min, 2.4° C./min, 2.5° C./min, 2.6° C./min, 2.7° C./min, 2.8° C./min, 2.9° C./min, 3° C./min, 4° C./min, 5° C./min, 6° C./min, 7° C./min, 8°

C./min, 9° C./min, 10° C./min, 11° C./min, 12° C./min, or more. In some examples, the temperature ramp rate, at any given time, in a reactor wherein waste plastic feedstock is thermally decomposed is at most about 12° C./min, 11° C./min, 10° C./min, 9° C./min, 8° C./min, 7° C./min, 6° C./min, 5° C./min, 4° C./min, 3° C./min, 2.9° C./min, 2.8° C./min, 2.7° C./min, 2.6° C./min, 2.5° C./min, 2.4° C./min, 2.3° C./min, 2.2° C./min, 2.1° C./min, 2° C./min, 1.9° C./min, 1.8° C./min, 1.7° C./min, 1.6° C./min, 1.5° C./min, 1.4° C./min, 1.3° C./min, 1.2° C./min, 1.1° C./min, 1° C./min, 0.9° C./min, 0.8° C./min, 0.7° C./min, 0.6° C./min, 0.5° C./min, 0.4° C./min, 0.3° C./min, 0.2° C./min, 0.1° C./min, or less. In some examples, the temperature ramp rate, at any given time, in a reactor wherein waste plastic feedstock is thermally decomposed is from about 0.1° C./min to 10° C./min. In some examples, the temperature ramp rate in a reactor wherein waste plastic feedstock is thermally decomposed is from about 0.1° C./min to 3° C./min. In some examples, the temperature ramp rate is from about 0.1° C./min to 1° C./min. In some examples, the temperature ramp rate is from about 0.1° C./min to 0.7° C./min. In some examples, the temperature ramp rate is from about 0.1° C./min to 0.3° C./min, 0.3° C./min to 0.6° C./min, 0.6° C./min to 0.9° C./min, 0.9° C./min to 1.2° C./min, 1.2° C./min to 1.5° C./min, 1.5° C./min to 1.8° C./min, 1.8° C./min to 2.1° C./min, 2.1° C./min to 2.4° C./min, 2.4° C./min to 2.7° C./min, 2.7° C./min to 3.0° C./min, 3° C./min to 5° C./min, 5° C./min to 7° C./min, 7° C./min to 9° C./min, or 9° C./min to 11° C./min.

In some examples, an optimum temperature is determined. In some examples, the optimum temperature is at least about 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C., 305° C., 310° C., 315° C., 320° C., 325° C., 330° C., 335° C., 340° C., 345° C., 350° C., 355° C., 360° C., 365° C., 370° C., 375° C., 380° C., 385° C., 390° C., 395° C., 400° C., or more. In some examples, the optimum temperature is at most about 400° C., 395° C., 390° C., 385° C., 380° C., 375° C., 370° C., 365° C., 360° C., 355° C., 350° C., 345° C., 340° C., 335° C., 330° C., 325° C., 320° C., 315° C., 310° C., 305° C., 200° C., 295° C., 290° C., 285° C., 280° C., 275° C., 270° C., 265° C., 260° C., 255° C., 250° C., 245° C., 240° C., 235° C., 230° C., 225° C., 220° C., 215° C., 210° C., 205° C., 200° C., 195° C., 190° C., 185° C., 180° C., 175° C., 170° C., 165° C., 160° C., 155° C., 150° C., 145° C., 140° C., 135° C., 130° C., 125° C., 120° C., 115° C., 110° C., 105° C., 100° C., or less. In some examples, the optimum temperature is from about 100° C. to 400° C. In some examples, the optimum temperature is from about 150° C. to 350° C. In some examples, the optimum temperature is from about 200° C. to 300° C. In some examples, the optimum temperature is from about 220° C. to 270° C. In some examples, the optimum temperature is from about 100° C. to 150° C., 150° C. to 200° C., 200° C. to 250° C., 250° C. to 300° C., 300° C. to 350° C., or 350° C. to 400° C.

Methods of the disclosure generally involve the thermal decomposition of a waste plastic feedstock over time. In some examples, the reaction time is from about 1 hour to 10 hours. In some examples, the reaction time is from about 2 hours to 10 hours. In some examples, the reaction time is from about 1 hour to 5 hours. In some examples, the reaction time is from about 2 hours to 5 hours. In some examples, the reaction time is from about 3 hours to about 5 hours. In some examples, the reaction time is from about 4 hours to 5 hours. In some examples, the reaction time is from about 5 hours to 6 hours. In some examples, the reaction time is at least about 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, or 10 hours, or more. In some examples, the reactor time is at most about 10, 9.75, 9.5, 9.25, 9, 8.75, 8.5, 8.25, 8, 7.75, 7.5, 7.25, 7, 6.75, 6.5, 6.25, 6, 5.75, 5.5, 5.25, 5, 4.75, 4.5, 4.25, 4, 3.75, 3.5, 3.25, 3, 2.75, 2.5, 2.25, 2, 1.75, 1.5, 1.25, 1, 0.75, 0.5, or 0.25 hours, or less.

Methods of the disclosure generally involve the production of at least one lower molecular-weight hydrocarbon from the thermal decomposition of a waste plastic feedstock in the presence of a residue generated from one or more previously heated waste plastic feedstock(s). In some examples, methods of the disclosure may utilize a weight percent of residue to waste plastic feedstock from about 5%-200%. In some examples, the weight percent of residue to waste plastic feedstock is from about 5%-100%. In some examples, the weight percent of residue to waste plastic feedstock is from about 5%-90%. In some examples, the weight percent of residue to waste plastic feedstock is from about 5%-80%. In some examples, the weight percent of residue to waste plastic feedstock is from about 5%-70%. In some examples, the weight percent of residue to waste plastic feedstock is from about 5%-60%. In some examples, the weight percent of residue to waste plastic feedstock is from about 5%-50%. In some examples, the weight percent of residue to waste plastic feedstock is from about 5%-40%. In some examples, the weight percent of residue to waste plastic feedstock is from about 5%-30%. In some examples, the weight percent of residue to waste plastic feedstock is from about 5%-20%. In some examples, the weight percent of residue to waste plastic is at least about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 100%, 110%, 120%, 130%, 140%, 150%, 160%, 170%, 180%, 190%, 200%, or more. In some example, the weight percent of residue to waste plastic is at most about 200%, 190%, 180%, 170%, 160%, 150%, 140%, 130%, 120%, 110%, 100%, 95%, 90%, 85%, 80%, 75%, 70%, 65%, 60%, 55%, 50%, 45%, 40%, 35%, 30%, 25%, 20%, 19%, 18%, 17%, 16%, 15%, 14%, 13%, 12%, 11%, 10%, 9%, 8%, 7%, 6%, 5%, 4%, 3%, 2%, 1%, or less.

Methods of the disclosure may include one or more chemical additives added to the reactor to improve the efficiency of thermal decomposition of a waste plastic feedstock. Non-limiting examples of agents that may be used as a chemical additive include calcium hydroxide, aluminum trioxide, aluminum oxide, sodium hydroxide, zinc oxide, activated carbon, ferric oxide, ferric carbonate, and sodium bicarbonate.

Methods of the disclosure may be comprised of distillation methods to separate lower molecular-weight hydrocarbons from a thermally decomposed waste plastic feedstock. In a general distillation method, one or more component liquid species may be separated from a liquid mixture based on differing boiling points of the component liquids in the mixture. Through executing some methods of the disclosure, a solid waste plastic feedstock is heated, and portions of the feedstock may be liquefied and decomposed to form, at least in part, a liquid mixture of lower molecular-weight hydrocarbons. As the liquid mixture of lower molecular-weight hydrocarbons is heated with increasing temperature, the temperature of the liquid mixture may step through the boiling temperatures of the mixture's lower molecular-weight hydrocarbon components. When a boiling temperature of a lower molecular-weight hydrocarbon component is reached, that component may be vaporized and boil off the mixture. Each component may have a different boiling point from other components in the mixture and, thus, separation of the mixture into its component lower molecular-weight hydrocarbon species may be achieved. As a component lower molecular-weight hydrocarbon species is distilled off from the liquid mixture, the lower molecular-weight hydrocarbon vapor stream that is generated may be directed into a region of substantially lower temperature wherein the vapor is condensed and recovered in as a liquid distillate. As a component lower molecular-weight hydrocarbon species is distilled off from the liquid mixture, the lower molecular-weight hydrocarbon vapor stream that is generated may be directed into a region of substantially lower temperature wherein the vapor is condensed and recovered in as a liquid distillate, such, as for example, in a condenser. In some examples, the liquid that was not distilled (sometimes called the "bottoms" product) is recovered. In some examples, methods of the disclosure may be comprised of a single stage distillation or may be comprised of multiple distillation stages. In some examples, wherein methods of the disclosure are comprised of multiple distillation stages, multiple distillation stages may be completed in a single unit operation, for example, a fractional distillation unit. In some examples, wherein methods of the disclosure are comprised of multiple distillation stages, multiple distillation stages may be completed in a series of staged units, such as, for example, a series of still pots fluidly linked together via one or more condenser unit operations. In some examples, more specialized forms of distillation may be useful, with non-limiting examples of more specialized forms of distillation that include steam distillation, vacuum distillation, air-sensitive vacuum distillation, short path distillation, zone distillation, extractive distillation, or flash distillation. In some examples, distillation methods may be executed in batch mode or continuous mode.

Methods of the disclosure may be comprised of additional separation methods to separate chemical species, including, for example, the further refinement of lower molecular-weight hydrocarbon distillates that are generated. Such methods may be utilized upstream or downstream of a thermal waste plastic feedstock process, depending on the particular need. Non-limiting examples of additional separation methods, in addition to distillation, that may be included in methods of the disclosure include evaporation separation methods, absorption separation methods, adsorption separation methods, liquid-liquid extraction separation methods, membrane separation methods, filtration separation methods, and sedimentation separation methods.

Methods of the disclosure may be comprised of evaporation separation methods. Evaporation separation methods generally involve the vaporization of one or more components of a liquid mixture. Evaporation may occur at ambient temperature or may be accelerated, for example, with heating. Evaporation methods may be useful in methods of the disclosure, for example, for concentrating lower molecular-weight hydrocarbon products that may be obtained from executing methods of the disclosure or may be useful for removing relatively volatile components from a liquid mixture.

Methods of the disclosure may be comprised of absorption separation methods. In general, absorption separation methods involve the contacting of a gas with a liquid phase to remove solutes of either the gas or liquid phase. Absorption separation methods may be useful in methods of the disclosure, for example, for capturing desired solutes contained in a gas phase during separation processes or removing unwanted components from a liquid phase.

Methods of the disclosure may be comprised of adsorption separation methods. In general, adsorption separation methods involve a solid matrix, in which a gas or liquid stream is flowed through the matrix and the solid matrix adheres desired components of the gas or liquid stream. Adsorption unit operations may be useful in methods of the disclosure, for example, in removing contaminants from a gas or liquid stream.

Methods of the disclosure may be comprised of liquid-liquid extraction separation methods. Liquid-liquid extraction separation generally involves the contacting of one or more liquids, wherein mass is transferred from one liquid to another. Liquid-liquid extraction unit operations may be useful in methods of the disclosure, for example, in further purifying a liquid stream.

Methods of the disclosure may be comprised of membrane separation methods. Membrane unit operations generally involve the mass transfer of one or more solutes from a liquid or gas phase to another liquid or gas phase, through a semi-permeable membrane. In some examples, the membrane permeability of a species may be controlled, in whole or part, by molecular weight of the species electric charge of the species, or and/or lipophilicity of the species. Membrane unit operations may be useful in methods of the disclosure, for example, in further purifying gas and liquid streams. Non-limiting examples of membrane separation processes include dialysis and reverse osmosis.

Methods of the disclosure may be comprised of filtration separation methods. Filtration separation methods generally remove solid species from a liquid mixture by size exclusion. Small holes in a filter media, for example, may block the passage of larger solid particles while remaining permeable to a liquid mobile phase that contains the larger particles. Solid particles that cannot penetrate the filter media may build-up on the filter media to form a filter cake. Filtration unit operations may be useful in methods of the disclosure, for example, for removing solid contaminants of liquid streams or for removing solid materials from a liquid mixture, formed from material precipitation during processing.

Methods of the disclosure may be comprised of sedimentation separation methods. Sedimentation separation methods generally involve the removal of solid species from a fluid mixture by gravity and/or an applied force, such as, for example centrifugal force or electromagnetic force. Larger particles generally may have faster settling velocities than smaller particles and the two may be differentially separated exploiting the differences in settling velocity. Sedimentation unit operations may be useful in systems of the disclosure, for example, for removing solid contaminants of purified liquid or gas streams or for removing solid materials formed from material precipitation during material processing.

Mass conversion achieved from executing methods of the disclosure may vary depending on the specific reaction parameters used. In some examples, the reactor contains residue built-up from prior heating of one or more waste plastic feedstocks. Conversion rates may be lower in reactors where build up has only recently commenced, when compared to reactors that contain significant residue build-up. Such differences in conversion rates may be due to the lower levels of catalytic metals present in lower levels of residue. In some examples, the mass conversion achieved is from about 0% to 100%. In some examples, the mass conversion achieved is from about 10% to 100%. In some examples, the mass conversion achieved is from about 20% to 100%. In some examples, the mass conversion achieved is from about 30% to 100%. In some examples, the mass conversion achieved is from about 40% to 100%. In some examples, the mass conversion achieved is from about 50% to 100%. In some examples, the mass conversion achieved is from about 60% to 100%. In some examples, the mass conversion achieved is from about 70% to 100%. In some examples, the mass conversion achieved is from about 70% to 95%. In some examples, the mass conversion achieved is from about 70% to 90%. In some examples, the mass conversion achieved is from about 70% to 85%. In some examples, the mass conversion achieved is from about 65% to 100%. In some examples, the mass conversion achieved is from about 65% to 99%. In some examples, the mass conversion achieved is from about 65% to 98%. In some examples, the mass conversion achieved is from about 65% to 97%. In some examples, the mass conversion achieved is from about 65% to 96%. In some examples, the mass conversion achieved is from about 65% to 95%. In some examples, the mass conversion achieved is at least about 0%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24% 25%, 26%, 27%, 28%, 29%, 30%, 31%, 32%, 33%, 34% 35%, 36%, 37%, 38%, 39%, 40%, 45%, 50%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%. In some examples, the mass conversion achieved is at most about 100%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 50%, 45%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, 1%, or less.

Lower molecular-weight hydrocarbons may be produced by methods of the disclosure. In some examples, hydrocarbons may be produced that possess carbon-chain lengths from about $C_1$ to $C_{30}$. In some examples, hydrocarbons may be produced that possess carbon-chain lengths from about $C_5$ to $C_{15}$. In some examples, hydrocarbons may be produced that possess carbon-chain lengths from about $C_{15}$ to $C_{28}$. In some examples, lower molecular-weight hydrocarbons that may be produced by methods of the disclosure may include liquid-phase species or gas-phase species. Gas-phase species may be very low carbon-chain length hydrocarbons that cannot be condensed at ambient conditions. Non-limiting examples of lower molecular-weight hydrocarbons produced by methods of the disclosure include alcohols (e.g., methanol, ethanol, propanols, butanols, pentanols, hexanols, heptanols, octanols, nonanols, decanols, undecanols, dodecanols, tridecanols, tetradecanols, pentadecanols, hexadecanols, heptadecanols, octadecanols, nonadecanols, eicosanols, heneicosanols, docosanols, tricosanols, pentacosanols, hexacosanols, octacosanol s, tetracosanols, heptacosanols, nonacosanols, triacontanols), aldehydes (e.g., formaldehyde, acetaldehyde, propanals, butanals, pentanals, hexanals, heptanals, octanals, nonanals, decanals, undecanals, dodecanals, tridecanals, tetradecanals, pentadecanals, hexadecanals, heptadecanals, octadecanals, nonadecanals, eicosanals, heneicosanals, docosanals, tricosanals, pentacosanals, hexacosanals, octacosanals, tetracosanals, heptacosanals, nonacosanals, triacontanals), ketones (e.g., acetone, butanones, pentanones, hexanones, heptanones, octanones, nonanones, decanones, undecanones, dodecanones, tridecanones, tetradecanones, pentadecanones, hexadecanones, heptadecanones, octadecanones, nonadecanones, eicosanones, heneicosanones, docosanones, tricosanones, pentacosanones, hexacosanones, octacosanones, tetracosanones, heptacosanones, nonacosanones, triacontanones), alkanes (e.g., methane, ethane, propanes, butanes, pentanes, hexanes, heptanes, octanes, nonanes, decanes, undecanes, dodecanes, tridecanes, tetradecanes, pentadecanes, hexadecanes, heptadecanes, octadecanes, nonadecanes, eicosanes, heneicosanes, docosanes, tricosanes, pentacosanes, hexacosanes, octacosanes, tetracosanes, heptacosanes, nonacosanes, triacontanes), alkenes (e.g., methene, ethene, propenes, butenes, pentenes, hexenes, heptenes, octenes, nonenes, decenes, undecenes, dodecenes, tridecenes, tetradecenes, pentadecenes, hexadecenes, heptadecenes, octadecenes, nonadecenes, eicosenes, heneicosenes, docosenes, tricosenes, pentacosenes, hexacosenes, octacosenes, tetracosenes, heptacosenes, nonacosenes, triacontenes), alkynes (e.g., methyne, ethyne, propynes, butynes, pentynes, hexynes, heptynes, octynes, nonynes, decynes, undecynes, dodecynes, tridecynes, tetradecynes, pentadecynes, hexadecynes, heptadecynes, octadecynes, nonadecynes, eicosynes, heneicosynes, docosynes, tricosynes, pentacosynes, hexacosynes, octacosynes, tetracosynes, heptacosynes, nonacosynes, triacontynes), and carboxylic acids (e.g., formic acid, acetic acid, propanoic acids, butanoic acids, pentanoic acids, hexanoic acids, heptanoic acids, octanoic acids, nonanoic acids, decanoic acids, undecanoic acids, dodecanoic acids, tridecanoic acids, tetradecanoic acids, pentadecanoic acids, hexadecanoic acids, heptadecanoic acids, octadecanoic acids, nonadecanoic acids, eicosanoic acids, heneicosanoic acids, docosanoic acids, tricosanoic acids, pentacosanoic acids, hexacosanoic acids, octacosanoic acids, tetracosanoic acids, heptacosanoic acids, nonacosanoic acids, triacontanoic acids).

In some examples, lower molecular-weight hydrocarbons that may be produced by methods of the disclosure may be useful as fuels with non-limiting examples that include automobile fuel, passenger and commercial truck fuel, heating fuel, aircraft fuel, small-engine fuel, f generators, train fuel, industrial equipment fuels, chemical processing equipment fuels, and ship fuel.

Systems

Figure 6:
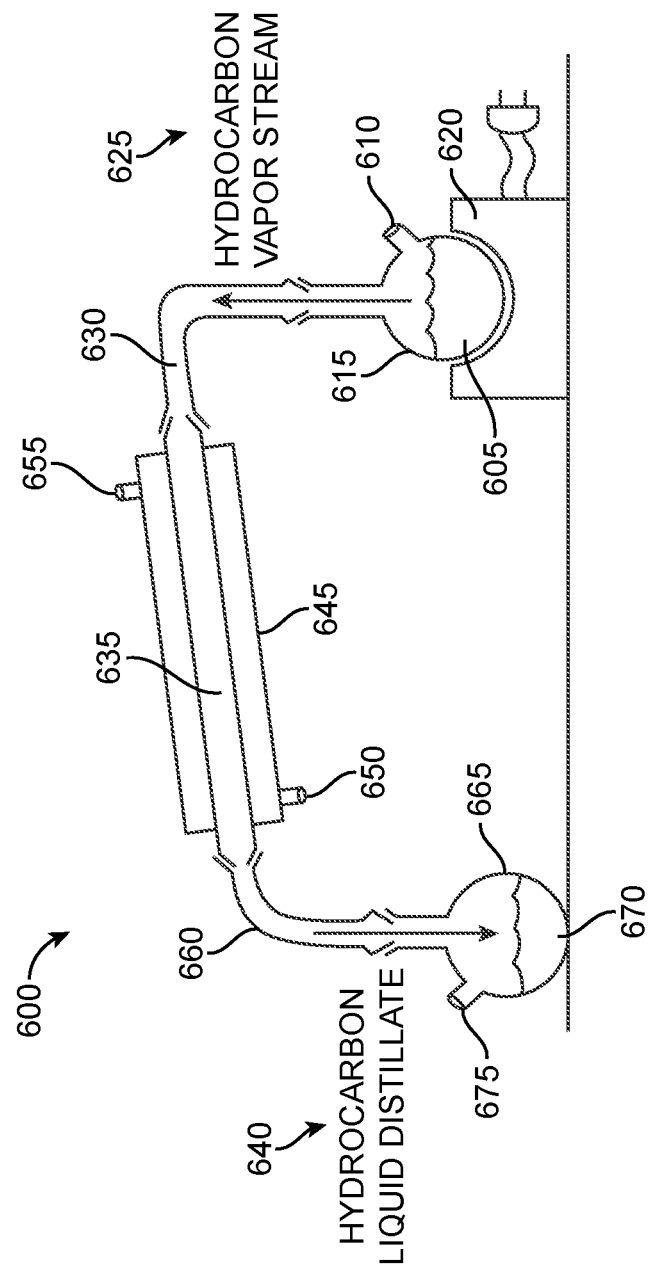
FIG. 6 schematically illustrates an example system of the disclosure capable of executing a method of the disclosure in batch mode.

The disclosure also provides systems that may be utilized to execute methods of the disclosure that convert a waste plastic feedstock to lower molecular-weight hydrocarbon materials. In some examples, systems of the disclosure may be capable of operating in batch mode. In some examples, systems of the disclosure may be capable of operating in continuous mode, or in either batch mode or continuous mode. An example system 600 that can operate in batch mode is shown in FIG. 6. In the example system 600, a waste plastic feedstock bolus 605 can be provided all-at-once, through a closable port 610, to a reactor 615 that contains residue from a previously heated waste plastic feedstock. Port 610 can then be closed for heating of reactor 615. Reactor 615 may be a glass, flask-style reactor and may be in thermal and mechanical contact with an external electrical heater 620. With port 610 closed, the waste plastic feedstock bolus 605 can be heated and liquefied to generate a vapor stream 625 of lower molecular-weight hydrocarbons. The reactor 615 may be fluidly connected, via a glass connector 630 that may serve as a transport route for vapor stream 625, to a condenser unit 635 that condenses vapor stream 625 to a liquid distillate 640. The condenser 635 may be circumscribed with a cooling jacket 645. Cooling water may enter the jacket at inlet 650, and may be capable of reducing the temperature inside condenser 635, and may exit the jacket at outlet 655. The condenser 635 may be angled such that gravity can transport, via fluidly connected glass connector 660, the liquid distillate 640 from the condenser 635 into a glass, distillate recovery flask 665. The final product 670 may be removed from the glass, distillate recovery flask 665, via closable port 675.

Figure 7:
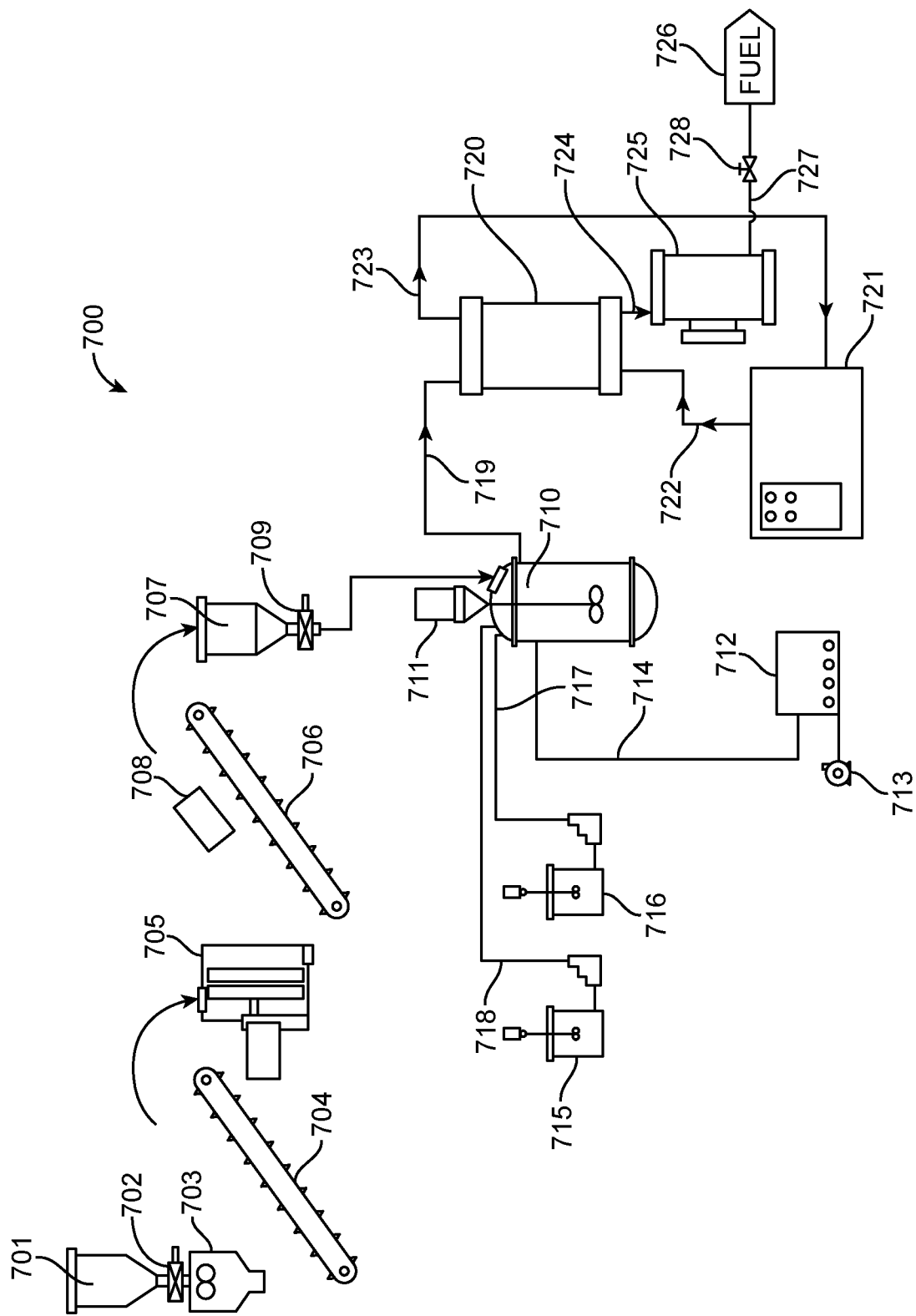
FIG. 7 schematically illustrates an example system of the disclosure capable of executing a method of the disclosure in batch or continuous mode.

An example system 700 that can be operated in continuous or batch mode is shown in FIG. 7. In example system 700, a waste plastic feedstock storage silo 701 stores waste plastic feedstock. A gate 702 connected to waste plastic feedstock storage silo 701 may be used to release waste plastic feedstock from the waste plastic feedstock storage silo 701 into a primary grinder 703. Primary grinder 703 can reduce the size of the waste plastic feedstock obtained from waste plastic feedstock storage silo 701. The ground waste plastic feedstock may then be deposited from primary grinder 703, via gravity, onto a conveyor belt 704 arranged to transport the ground waste plastic feedstock into secondary grinder 705. Secondary grinder 705 can further reduce the size of the ground waste plastic feedstock received from conveyor belt 704. The double-ground waste plastic feedstock may then be deposited from secondary grinder 705, onto conveyor belt 706, arranged to transport the double-ground waste plastic feedstock into batch chute 707. As the double-ground waste plastic feedstock is transported by conveyor belt 706 to batch chute 707, the double-ground waste plastic feedstock is exposed to a magnetic separator 708 that can remove unwanted magnetic materials from the double-ground waste plastic feedstock. A gate 709 connected to batch chute 707 may be used to release, via gravity, double-ground waste plastic feedstock into reactor 710. Reactor 710 may be a jacketed, stainless-steel vessel that may be equipped with an agitator 711 that may be used to stir the contents of reactor 710. Reactor 710 may be equipped with temperature and pressure sensors necessary to communicate with control systems, a pressure relief valve, and may be heated with a heat transfer fluid that is circulated through the equipped jacket. The heat transfer fluid may be provided by a heat transfer fluid tank 712 that may be equipped with a pump 713 that can regulate the flow of heat transfer fluid, via piping 714, into the jacket of reactor 710. Heat transfer fluid tank 712 includes a heat-exchanger that heats the heat transfer fluid prior to its circulation in the jacket of reactor 710. Chemical additive storage tanks 715 and 716 can each provide an optional chemical additive, via piping 717 and 718 respectively, to reactor 710. Reactor 710 may be fluidly connected, via piping 719 to a condenser 720. Piping 719 may be capable of receiving lower molecular-weight vapor streams generated from thermal decomposition of waste plastic feedstocks in reactor 710 and directing the vapor streams into condenser 720. Condenser 720 can receive the vapor streams via piping 719 and condense the vapor streams to produce a liquid distillate. Chilled cooling water can be circulated through the condenser 720 to reduce temperatures inside condenser 720 to values required for proper vapor stream condensation. Chilled water may be provided by water chiller 721, via piping 722, to condenser 720. After its use in condenser 720, spent chilled water can be recycled, via piping 723, back to water chiller 721. The liquid distillate that is recovered by condenser 720, may be transported, via piping 724, into product storage tank 725. Product 726 can be transported to downstream processes for further use via piping 727, which may be controlled by control valve 728.

In an example of batch mode operation, system 700 may be operated such that a bolus of waste plastic feedstock is provided from waste plastic feedstock storage silo 701 by gate 702, and the bolus pre-processed using primary grinder 703 and secondary grinder 705. The double-ground waste plastic feedstock is transported, via conveyor belt 706, to batch chute 707, where it is further stored. A bolus of double-ground waste plastic (either all of, or a portion of, the double-ground waste plastic feedstock supplied to batch chute 707) is then supplied, possibly at a later time, via gate 709, to reactor 710 for its thermal decomposition. Vapor streams that may be generated in reactor 710 may be directed further downstream for condensation in condenser 720 and collection of the liquid distillate in storage tank 725.

In an example of continuous mode operation, system 700 may be operated such that waste plastic feedstock stored in waste plastic feedstock storage silo 701 may be released continuously by gate 702, for continuous pre-processing in primary 703 and secondary 704 grinders. Double-ground waste plastic feedstock may then be continuously added, via conveyor belt 706, into batch chute 707, where it may or may not be accumulated. Gate 709 may continuously supply double-ground waste plastic feedstock from batch chute 707 into reactor 710 for its continuous heating and thermal decomposition. Vapor streams may be generated from reactor 710 continuously and, thus, may be continuously routed downstream for condensation in condenser 720 and collection of the liquid distillate in storage tank 725.

Figure 8A:
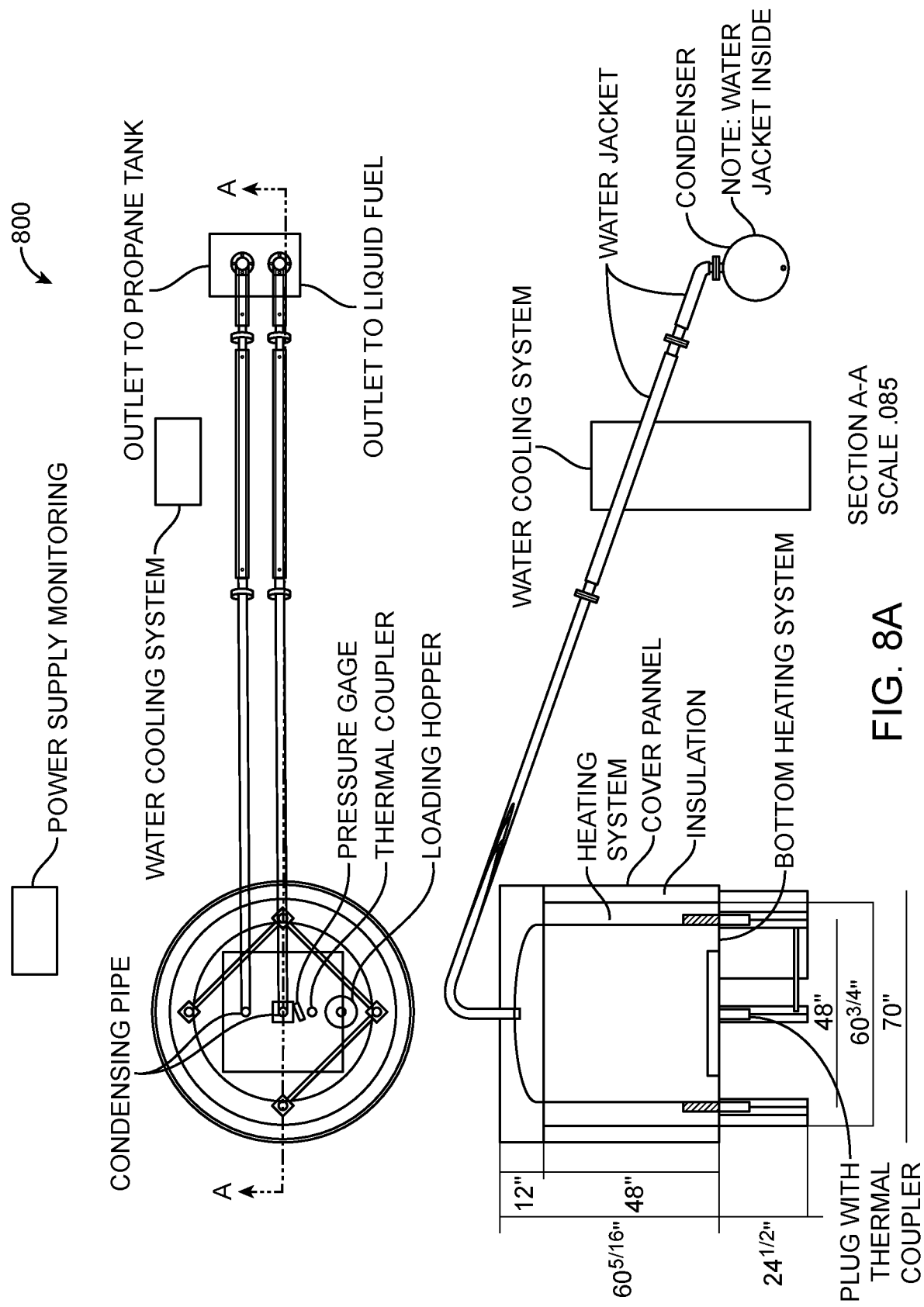
FIG. 8A schematically illustrates side and top views of an example system of the disclosure capable of executing a method of the disclosure using a single reactor and a single condenser unit.

FIG. 8A schematically illustrates side and top views of an example system 800 capable of executing a method of the disclosure using a single reactor and a single condenser unit. As depicted in FIG. 8A, the system 800 may comprise a single reactor. The single reactor may comprise any reactor described herein. The single reactor may comprise a heater. The heater may comprise any heater described herein. The system may further comprise a single condenser unit. The single condenser unit may comprise any condenser unit described herein. The single condenser unit may be fluidically connected to the single reactor. The single condenser may be configured to condense a vapor stream containing one or more chemical components (such as any chemical components described herein) from the single reactor into one or more liquid streams (such as any liquid stream described herein). The system may further comprise a controller. The controller may be configured to use the heater to maintain a temperature of the single reactor to a present cracking temperature or temperature range (such as any cracking temperature or temperature range described herein) to yield the one or more chemical components.

Although described as comprising a single reactor and a single condenser herein, the system 800 may comprise any number of reactors and condensers. For instance, the system may comprise at least about 1, 2, 3, 4, 5, 6, 7, 8, 9, 10, 20, 30, 40, 50, 60, 70, 80, 90, 100, or more reactors or condensers. The system may comprise at most about 100, 90, 80, 70, 60, 50, 40, 30, 20, 10, 9, 8, 7, 6, 5, 4, 3, 2, or 1 reactors or condensers. The system may comprise a number of reactors or condensers that is within a range defined by any two of the preceding values.

The reactor may comprise a residue produced from a previously heated plastic feedstock, as described herein. The residue may have any calcium to sodium mass ratio described herein. For instance, the residue may have a calcium to sodium mass ratio from about 0.0001 to 400, as measured by inductively-coupled plasma (ICP) spectrometry, as described herein. In some examples, the residue may have a calcium to sodium mass ratio of at least about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900, 1,000, or more. In some examples, the residue may have a calcium to sodium mass ratio of at most about 1,000, 900, 800, 700, 600, 500, 400, 300, 200, 100, 90, 80, 70, 60, 50, 40, 30, 20, 10, 9, 8, 7, 6, 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.009, 0.008, 0.007, 0.006, 0.005, 0.004, 0.003, 0.002, 0.001, 0.0009, 0.0008, 0.0007, 0.0006, 0.0005, 0.0004, 0.0003, 0.0002, 0.0001, or less. In some examples, the residue may have a calcium to sodium mass ratio from about 0.0001 to 400. In some examples, In some examples, the residue may have a calcium to sodium mass ratio from about 0.005 to 400. In some examples, the residue may have a calcium to sodium mass ratio from about 0.005 to 280. In some examples, In some examples, the residue may have a calcium to sodium mass ratio from about 0.0001 to 4. In some examples, In some examples, the residue may have a calcium to sodium mass ratio from about 0.0001 to 0.04. In some examples, In some examples, the residue may have a calcium to sodium mass ratio from about 0.0001 to 0.04, 0.0001 to 0.4, 0.0001 to 4, 0.0001 to 40, or 0.0001 to 400. In some examples, In some examples, the residue may have a calcium to sodium mass ratio from about 0.00001 to 1000, 0.0001 to 400, or 0.001 to 4. In some examples, In some examples, the residue may have a calcium to sodium mass ratio from about 0.0001 to 1000, 0.0001 to 100, 0.0001 to 10, 0.0001 to 1, 0.0001 to 0.1, 0.0001 to 0.01, or 0.0001 to 0.001.

As depicted in FIG. 8A, the system may further comprise a power supply coupled to the heater and a power supply monitor configured to monitor power supplied to the heater. The system may comprise a pressure gage configured to monitor pressure within the reactor. The pressure within the reactor may be maintained or regulated at a chosen pressure using, for instance, a pressure relief valve. The reactor may be hermetically sealed. The reactor may comprise one or more access ports to allow plastic to be loaded into the reactor. The access ports may be configured to accept on or more loading hoppers. The system may further comprise a water cooling system. The water cooling system may comprise a water jacket.

Figure 8B:
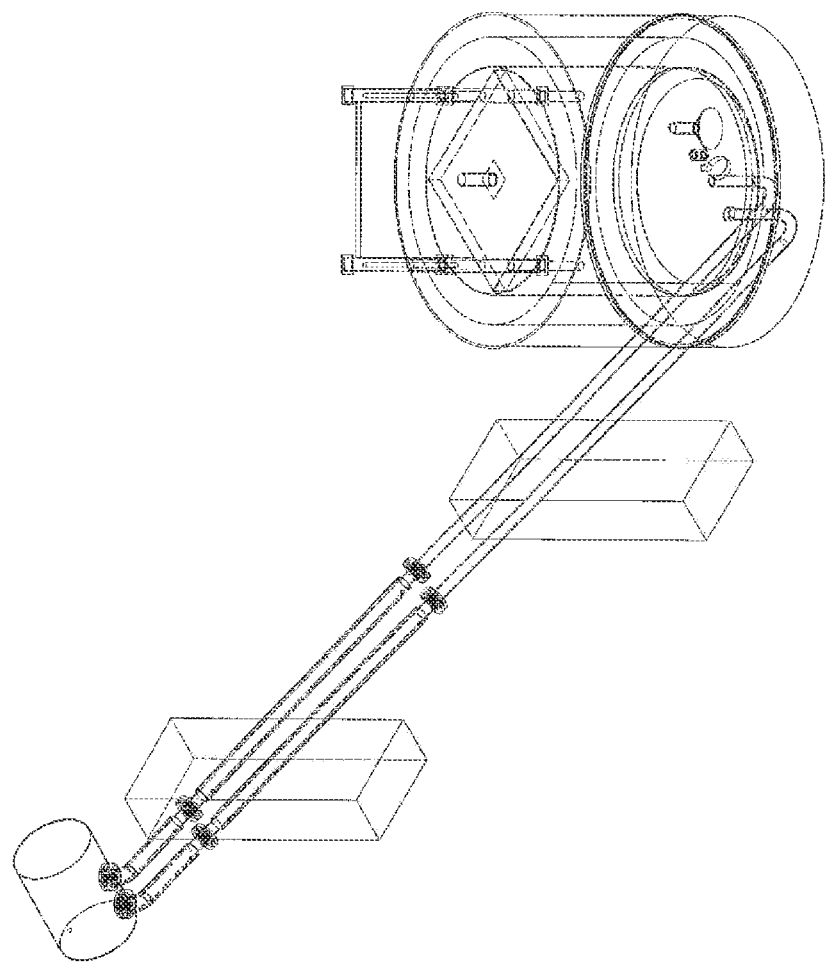
FIG. 8B schematically illustrates an orthographic view of an example system of the disclosure capable of executing a method of the disclosure using a single reactor and a single condenser unit.

FIG. 8B schematically illustrates an orthographic view of the example system 800 of the disclosure capable of executing a method of the disclosure using a single reactor and a single condenser unit.

The example systems 600, 700, and 800 shown in FIGS. 6, 7, 8A, and 8B are examples and may not include components necessary for executing a particular method of the disclosure. Various combinations of unit operations, material storage vessels, material transport equipment, sensors, control systems, and equipment (e.g., control valves, heaters, etc.) that may be used to exercise control over a system. Various, non-limiting examples of components that may be included in systems of the disclosure and the arrangement of such components are outlined in the paragraphs that follow.

Systems of the disclosure may include one or more plastic storage vessels capable of storing and serving as, for example, a source of raw waste plastic or a waste plastic feedstock. Plastic storage vessels may be capable of being held at ambient temperature or may be capable of being temperature controlled to prevent volatilization of the contained materials. Plastic storage vessels may be capable of being held at atmospheric pressure or may be capable of being pressurized in order to maximize the holding capacity of the contained materials. Non-limiting examples of vessels that may be utilized as plastic storage vessels include silos, tanks, flasks, stills, pots, kettles, and beakers.

Systems of the disclosure may include one or more sorting unit operations to sort raw waste plastics or waste plastic feedstocks for their use in a waste plastic feedstock of desired composition. Non-limiting examples of sorting capabilities of a sorting unit operation include the capability to sort by material size (e.g., length, width, or thickness), material color, plastic type, or weight. In some examples, systems of the disclosure may contain one or more sorting unit operations that are consecutively staged or discontinuously staged. In some examples, systems of the disclosure may contain one or more sorting unit operations that are staged in parallel. In some examples, a sorting unit operation may be capable of being operated in batch mode or continuous mode.

Systems of the disclosure may include one or more size reduction unit operations. Such unit operations may receive larger pieces of raw waste plastic and/or waste plastic feedstock and may be capable of reducing the size of large pieces. Non-limiting examples of unit operations that can reduce the size of raw waste plastic and/or waste plastic feedstock include grinders (e.g., hammer mill grinders, revolving grinding mills), crushers (e.g., jaw crushers, Blake crushers, gyratory crushers, roll crushers), shredders, cutting unit operations, tearing unit operations, granulators, and pelletizers. In some examples, systems of the disclosure may contain one or more size reduction unit operations that are consecutively staged or discontinuously staged. In some examples, systems of the disclosure may contain one or more size reduction unit operations that are staged in parallel. In some examples, a size reduction unit operation may be capable of being operated in batch mode or continuous mode.

Systems of the disclosure may include one or more waste plastic cleaning unit operations. Such unit operations may be capable of removing some contaminants (e.g., dirt, unwanted materials that have adhered to plastic surfaces) from raw waste plastic and/or waste plastic feedstock, and/or remove additives (e.g., colorants, adhesive labels, other structural support materials) utilized during manufacturing of raw waste plastic. In one example, a plastic cleaning unit operation may be a common household dishwasher. In some examples, a magnetic separator unit operation may be utilized and may be capable of removing undesired materials from raw waste plastic or waste plastic feedstock that may be magnetically responsive. In some examples, systems of the disclosure may contain one or more waste plastic cleaning or magnetic separator unit operations that are consecutively staged or discontinuously staged. In some examples, systems of the disclosure may contain one or more waste plastic cleaning or magnetic separator unit operations that are staged in parallel. In some examples, a waste plastic cleaning or magnetic separator unit operation may be capable of being operated in batch mode or continuous mode.

Systems of the disclosure may include one or more drying unit operations used to dry raw waste plastic and/or waste plastic feedstock. Such units may be capable of removing unwanted moisture from raw waste plastic or waste plastic feedstock. Such moisture may, for example, have been generated during a cleaning process or from atmospheric moisture that has condensed onto plastic surfaces. Non-limiting examples of drying unit operations that may be included in systems of the disclosure include tray dryers, vacuum-shelf indirect dryers, continuous tunnel dryers, rotary dryers, drum dryers, or spray dryers. In some examples, systems of the disclosure may contain one or more drying unit operations that are consecutively staged or discontinuously staged. In some examples, systems of the disclosure may contain one or more drying unit operations that are staged in parallel. In some examples, a drying unit operation may be capable of being operated in batch mode or continuous mode.

Systems of the disclosure may include one or more unit operations that are capable of weighing any material component consumed or generated by methods of the disclosure. Non-limiting examples of species that such unit operations may be capable of weighing include raw waste plastic, waste plastic feedstock, residue from a previously heated waste plastic feedstock, residue generated from a waste plastic currently being heated, vapor containing lower molecular-weight hydrocarbons distilled from decomposed waste plastic feedstock, liquid distillate recovered after condensation of a vapor containing lower molecular-weight hydrocarbons, or any product obtained from further refinement/separation of the recovered liquid distillate. Weighing units may be useful for a number of purposes with non-limiting examples that include determining correct reactant ratios, correct material supply levels, and reaction mass conversion. Unit operations used for weighing may be separate from other unit operations (e.g., a separate scale) or may comprise a larger unit operation. In one example, a plastic storage vessel may be comprised of a unit operation to weigh a waste plastic feedstock contained in the vessel. In some examples, systems of the disclosure may contain one or more weighing unit operations that are consecutively staged or discontinuously staged. In some examples, systems of the disclosure may contain one or more weighing unit operations that are staged in parallel. In some examples, a weighing unit operation may be capable of being operated in batch mode or continuous mode.

Systems of the disclosure may include one or more feeder unit operations. A feeder may be capable of molding a waste plastic feedstock into a size and shape appropriate for use inside a reactor and/or to transport waste plastic feedstock into a reactor. Non-limiting examples of a feeder unit operation that may included in systems of the disclosure include an extruder or batch chute. In some examples, systems of the disclosure may contain one or more feeder unit operations that are consecutively staged or discontinuously staged. In some examples, systems of the disclosure may contain one or more feeder unit operations that are staged in parallel. In some examples, a feeder unit operation may be capable of being operated in batch mode or continuous mode.

Systems of the disclosure rely on at least one reactor that may be used for thermal decomposition of a waste plastic feedstock into lower molecular-weight hydrocarbons. Non-limiting examples of vessels that may be used as reactors in systems of the disclosure include batch reactors, continuous-stir tank reactors, flow reactors, packed bed reactors, membrane reactors, flasks, stills, pots, fractional distillation columns, kettles, tanks, and beakers. Such reactors may or may not be comprised of at least one agitator that may be used to stir a heated reactor's contents. In some examples, a reactor may be capable of being operated in batch mode or continuous mode. In some examples, systems of the disclosure may include multiple reactors. Such reactors may be arranged in series, may be arranged in parallel, or may be arranged discontinuously. Reactors may also contain a residue generated from a previously heated waste plastic feedstock. As mentioned previously, residue in reactors may have been build-up in a reactor over repeated cycles of waste plastic feedstock heating and may contain metal agents capable of catalytic activity in the thermal decomposition of a waste plastic feedstock. In some examples, a residue may be adhered to an inner surface of a reactor used to heat a waste plastic feedstock or may be free from an inner surface of a reactor used to heat a waste plastic feedstock. In some examples, a reactor may contain both free and adhered residue.

In some instances, reactors used in systems of the disclosure may include residues that may be comprised, in whole or part, of metals. Such metals may be capable of acting as internal catalysts during thermal decomposition of a waste plastic feedstock. Non-limiting examples of metals that may be a component of residues that may be found in reactors include aluminum, antimony, arsenic, barium, beryllium, bismuth, boron, cadmium, calcium, cesium, chromium, cobalt, copper, gallium, germanium, gold, hafnium, indium, iron, lead, lithium, magnesium, manganese, mercury, molybdenum, nickel, platinum, palladium, potassium, rhodium, iridium, osmium, ruthenium, rhenium, rubidium, scandium, selenium, silicon, silver, sodium, strontium, tantalum, tellurium, thallium, thorium, tin, titanium, tungsten, vanadium, zinc, and zirconium.

In some instances, residues that may be contained in a reactor may be comprised of all of following elements: aluminum, antimony, arsenic, barium, beryllium, bismuth, boron, cadmium, calcium, cesium, chromium, cobalt, copper, gallium, germanium, gold, hafnium, indium, iron, lead, lithium, magnesium, manganese, mercury, molybdenum, nickel, platinum, palladium, potassium, rhodium, iridium, osmium, ruthenium, rhenium, rubidium, scandium, selenium, silicon, silver, sodium, strontium, tantalum, tellurium, thallium, thorium, tin, titanium, tungsten, vanadium, zinc, and zirconium. In some examples, residues that may be contained in a reactor may be comprised of at least one of the above elements. In some examples, residues that may be contained in a reactor may be comprised of at least two of the above elements. In some examples, residues that may be contained in a reactor may be comprised of at least three of the above elements. In some examples, residues that may be contained in a reactor may be comprised of at least four of the above elements. In some examples, residues that may be contained in a reactor may be comprised of at least five of the above elements. In some examples, residues that may be contained in a reactor may be comprised of at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more of the above elements. In some examples, residues that may be contained in a reactor may be comprised of at most about 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 of the above elements. In some examples, residues that may be contained in a reactor may be comprised of at least about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more of following elements: aluminum, antimony, arsenic, barium, beryllium, bismuth, boron, cadmium, calcium, cesium, chromium, cobalt, copper, gallium, germanium, gold, hafnium, indium, iron, lead, lithium, magnesium, manganese, mercury, molybdenum, nickel, platinum, palladium, potassium, rhodium, iridium, osmium, ruthenium, rhenium, rubidium, scandium, selenium, silicon, silver, sodium, strontium, tantalum, tellurium, thallium, thorium, tin, titanium, tungsten, vanadium, zinc, and zirconium. In some examples, residues that may be contained in a reactor may be comprised of at most about 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 or the following elements: aluminum, antimony, arsenic, barium, beryllium, bismuth, boron, cadmium, calcium, cesium, chromium, cobalt, copper, gallium, germanium, gold, hafnium, indium, iron, lead, lithium, magnesium, manganese, mercury, molybdenum, nickel, platinum, palladium, potassium, rhodium, iridium, osmium, ruthenium, rhenium, rubidium, scandium, selenium, silicon, silver, sodium, strontium, tantalum, tellurium, thallium, thorium, tin, titanium, tungsten, vanadium, zinc, and zirconium.

In some examples, residues that may be contained in a reactor may contain levels, measurable by ICP-OES, of the metals calcium and sodium. In some examples, the mass ratio of calcium to sodium in residues that may be contained in a reactor may be at least about 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 20, 30, 40, 50, 60, 70, 80, 90, 100, 200, 300, 400, 500, 600, 700, 800, 900, 1,000, or more. In some examples, the mass ratio of calcium to sodium in residues that may be contained in a reactor may be at most about 1,000, 900, 800, 700, 600, 500, 400, 300, 200, 100, 90, 80, 70, 60, 50, 40, 30, 20, 10, 9, 8, 7, 6, 5, 4, 3, 2, 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, 0.009, 0.008, 0.007, 0.006, 0.005, 0.004, 0.003, 0.002, 0.001, 0.0009, 0.0008, 0.0007, 0.0006, 0.0005, 0.0004, 0.0003, 0.0002, 0.0001, or less. In some examples, the mass ratio of calcium to sodium in residues that may be contained in a reactor may be from about 0.0001 to 400. In some examples, the mass ratio of calcium to sodium in residues that may be contained in a reactor may be from about 0.005 to 400. In some examples, the mass ratio of calcium to sodium in residues that may be contained in a reactor may be from about 0.005 to 280. In some examples, the mass ratio of calcium to sodium in residues that may be contained in a reactor may be from about 0.003 to 40. In some examples, the mass ratio of calcium to sodium in residues that may be contained in a reactor may be from about 0.003 to 4. In some examples, the mass ratio of calcium to sodium in residues that may be contained in a reactor may be from about 0.0001 to 0.04. In some examples, the mass ratio of calcium to sodium in residues that may be contained in a reactor may be from about 0.0001 to 0.04, 0.0001 to 0.4, 0.0001 to 4, 0.0001 to 40, or 0.0001 to 400. In some examples, the mass ratio of calcium to sodium in residues that may be contained in a reactor may be from about 0.0001 to 1000, 0.0001 to 100, 0.0001 to 10, 0.0001 to 1, 0.0001 to 0.1, 0.0001 to 0.01, or 0.0001 to 0.001.

Systems of the disclosure are generally comprised of one or more condenser unit operations (also "units" herein) that may be useful in condensing vapor streams into a liquid condensate. In some examples, a condenser unit operation may be a surface condenser, wherein a cooling fluid is used to cool a vapor stream but is not in contact with the vapor being cooled or the liquid condensate that is formed. In some examples, a condenser unit operation may be a direct-contact condenser, in which cooling fluid directly contacts the vapor being cooled and/or the liquid condensate that is formed. In some examples, systems of the disclosure may contain one or more condensers that are consecutively staged or discontinuously staged. In some examples, systems of the disclosure may contain one or more condensers that are staged in parallel. In some examples, a condenser may be capable of being operated in batch mode or continuous mode.

Systems of the disclosure may include one or more separation units. In some examples, such unit operations may arranged upstream or downstream from a reactor or condenser. Non-limiting examples of separation unit operations that may be included in systems of the disclosure include evaporation unit operations, absorption unit operations, distillation unit operations, adsorption unit operations, liquid-liquid extraction unit operations, membrane unit operations, filtration unit operations, and sedimentation unit operations.

In an example, a system includes a reactor for generating a vapor stream comprising one or more hydrocarbons. The vapor stream is directed into a distillation column that effects the separation of hydrocarbons into fluid stream. Individual fluid streams may be directed to additional separation units, such as additional distillation columns for further separation, as may be necessary.

Systems of the disclosure may include at least one separation unit operation that is an evaporation unit operation. In general, an evaporation unit may be capable of executing evaporation separation methods that may be useful, for example, for concentrating lower molecular-weight hydrocarbon products that may be obtained from executing methods of the disclosure or may be useful for removing relatively volatile components from a liquid mixture. Non-limiting examples of evaporation unit operations that may be included in systems of the disclosure include open kettles, open pans, horizontal-tube natural circulation evaporators, vertical-type natural circulation evaporators, long-tube vertical-type evaporators, falling-film type evaporators, forced-circulation type evaporators, agitated-file evaporators, open-pan solar evaporators, mechanical vapor recompression evaporators, and thermal vapor recompression evaporators. In some examples, an evaporator unit operation may be comprised of a single effect (i.e., a single-stage) or may be comprised of multiple effects (i.e., multiple-stages). In some examples, effects in a multiple-effect evaporator may be arranged in series. In some examples of a multiple-effect evaporator where effects may be arranged in series, a multiple-effect evaporator may be a forward-feed multiple-effect evaporator or a backward-feed multiple-effect evaporator. In some examples, effects in a multiple-effect evaporator may be arranged in parallel. In some examples, systems of the disclosure may contain one or more evaporator unit operations that are consecutively staged or discontinuously staged. In some examples, systems of the disclosure may contain one or more evaporator unit operations that are staged in parallel. In some examples, an evaporator unit operation may be arranged upstream or downstream from a reactor or condenser. In some examples, an evaporator unit operation may be capable of being operated in batch mode or continuous mode.

Systems of the disclosure may include at least one separation unit operation that is an absorption unit operation. In general, an absorption unit operation may be capable of executing absorption separation methods that may be useful, for example, for capturing desired solutes contained in a gas phase during separation processes or removing unwanted components from a liquid phase containing valuable lower molecular-weight hydrocarbons. In some examples, a system may utilize a gas phase or liquid phase that may be comprised of a single chemical component or may be a gas phase or liquid phase that may be a mixture of two or more chemical components. In some examples, a gas phase and liquid phase may be contacted in co-current flow or counter-current flow. In some examples, separations may be achieved in a single stage or multiple stages. Non-limiting examples of absorption unit operations that may be included in systems of the disclosure include a scrubber, stripper, tray towers, and packed towers. In some examples, an absorption unit operation may be a tray tower, wherein the trays used may be sieve trays, valve trays, or bubble-cap trays. In some examples, an absorption unit operation may be a packed tower, wherein the packing may be a Raschig ring, Lessing ring, Berl saddle, or Pall ring. In some examples, an absorption unit operation may be a packed tower, wherein the packing may be arranged randomly or in stacked arrangements inside the packed tower. In some examples, systems of the disclosure may contain one or more absorption unit operations that are consecutively staged or discontinuously staged. In some examples, systems of the disclosure may contain one or more absorption unit operations that are staged in parallel. In some examples, an absorption unit operation may be arranged upstream or downstream from a reactor or condenser. In some examples, an absorption unit operation may be capable of being operated in batch mode or continuous mode.

Systems of the disclosure may include at least one separation unit operation that is a distillation unit operation. In general, a distillation unit operation may be capable of executing distillation separation methods. As mentioned previously, distillation unit operations may be useful, for example, in separating component liquids from a liquid mixture, such as lower molecular-weight hydrocarbons that are generated from the thermal decomposition of a waste plastic feedstock. In some examples, a single stage distillation may be all that is needed to achieve a desired separation or multiple stages may be needed. Non-limiting examples of vessels used for a single-stage distillation unit operation include kettles, pots, stills, beakers, flasks, or tanks. In some examples, multiple stages of distillation may be completed in a single unit such as, for example, a fractional distillation tower. In some examples, stages in a fractional distillation column that is included in a system of the disclosure may be trays with non-limiting examples of trays that include sieve trays, valve trays, and bubble-cap trays. In some examples, a fractional distillation tower may also include one or more condenser units, wherein such condenser units may be arranged to route liquid distillate downstream to additional unit operations or arranged to route liquid distillate back into the fractional distillation tower for additional separation. In some examples, a fractional distillation unit may also include one or more reboiler units. In some examples, such reboiler units may be arranged to vaporize liquid that is removed from the fractional distillation tower, wherein the vapor can be directed downstream for further use or processing or can be directed back into the fractional distillation tower for further separation. In some examples, multiple cycles of distillation may be completed in staged units, such as, for example, a series of still pots fluidly linked together via one or more condenser unit operations. In some examples, a desired product or products may be recoverable from vapor streams generated during distillation and/or may be recovered from the liquid that remains in the distillation unit operation at the conclusion of distillation. In some examples, systems of the disclosure may be capable of more specialized forms of distillation with non-limiting examples of more specialized forms of distillation that include steam distillation, vacuum distillation, air-sensitive vacuum distillation, short path distillation, zone distillation, extractive distillation, or flash distillation. In some examples, systems of the disclosure may contain one or more distillation unit operations that are consecutively staged or discontinuously staged. In some examples, systems of the disclosure may contain one or more distillation unit operations that are staged in parallel. In some examples, a distillation unit operation may be arranged upstream or downstream from a reactor or condenser. In some examples, a distillation unit operation may be capable of being operated in batch mode or continuous mode.

Systems of the disclosure may include at least one separation unit operation (also "separation unit" herein) that is an adsorption unit operation. In general, an adsorption unit operation may be capable of executing adsorption separation methods that may be useful, for example, in removing contaminants from liquid stream, such as a liquid distillate generated from condensing a vapor stream containing valuable lower molecular-weight hydrocarbons. In some examples, the pore surface area of a solid matrix contained within an adsorption unit operation may be at least about 100 $m^2/g$, 200 $m^2/g$, 300 $m^2/g$, 400 $m^2/g$, 500 $m^2/g$, 600 $m^2/g$, 700 $m^2/g$, 800 $m^2/g$, 900 $m^2/g$, 1000 $m^2/g$, 1100 $m^2/g$, 1200 $m^2/g$, 1300 $m^2/g$, 1400 $m^2/g$, 1500 $m^2/g$, 1600 $m^2/g$, 1700 $m^2/g$, 1800 $m^2/g$, 1900 $m^2/g$, 2000 $m^2/g$, 2100 $m^2/g$, 2200 $m^2/g$, 2300 $m^2/g$, 2400 $m^2/g$, 2500 $m^2/g$, 2600 $m^2/g$, 2700 $m^2/g$, 2800 $m^2/g$, 2900 $m^2/g$, 3000 $m^2/g$, 3100 $m^2/g$, 3200 $m^2/g$, 3300 $m^2/g$, 3400 $m^2/g$, 3500 $m^2/g$, 3600 $m^2/g$, 3700 $m^2/g$, 3800 $m^2/g$, 3900 $m^2/g$, 4000 $m^2/g$, 4100 $m^2/g$, 4200 $m^2/g$, 4300 $m^2/g$, 4400 $m^2/g$, 4500 $m^2/g$, 4600 $m^2/g$, 4700 $m^2/g$, 4800 $m^2/g$, 4900 $m^2/g$, 5000 $m^2/g$, or more. In some examples, the pore surface area of a solid matrix contained within an adsorption unit operation may be at most about 5000 $m^2/g$, 4900 $m^2/g$, 4800 $m^2/g$, 4700 $m^2/g$, 4600 $m^2/g$, 4500 $m^2/g$, 4400 $m^2/g$, 4300 $m^2/g$, 4200 $m^2/g$, 4100 $m^2/g$, 4000 $m^2/g$, 3900 $m^2/g$, 3800 $m^2/g$, 3700 $m^2/g$, 3600 $m^2/g$, 3500 $m^2/g$, 3400 $m^2/g$, 3300 $m^2/g$, 3200 $m^2/g$, 3100 $m^2/g$, 3000 $m^2/g$, 2900 $m^2/g$, 2800 $m^2/g$, 2700 $m^2/g$, 2600 $m^2/g$, 2500 $m^2/g$, 2400 $m^2/g$, 2300 $m^2/g$, 2200 $m^2/g$, 2100 $m^2/g$, 2000 $m^2/g$, 1900 $m^2/g$, 1800 $m^2/g$, 1700 $m^2/g$, 1600 $m^2/g$, 1500 $m^2/g$, 1400 $m^2/g$, 1300 $m^2/g$, 1200 $m^2/g$, 1100 $m^2/g$, 1000 $m^2/g$, 900 $m^2/g$, 800 $m^2/g$, 700 $m^2/g$, 600 $m^2/g$, 500 $m^2/g$, 400 $m^2/g$, 300 $m^2/g$, 200 $m^2/g$, 100 $m^2/g$, In some examples, the pore surface area of a solid matrix contained within an adsorption unit operation may be from about 100 $m^2/g$ to 2000 $m^2/g$, from about 100 $m^2/g$ to 1800 $m^2/g$, from about 100 $m^2/g$ to 1600 $m^2/g$, from about 100 $m^2/g$ to 1400 $m^2/g$, from about 100 $m^2/g$ to 1200 $m^2/g$, from about 100 $m^2/g$ to 1000 $m^2/g$, from about 100 $m^2/g$ to 800 $m^2/g$, from about 100 $m^2/g$ to 600 $m^2/g$, from about 100 $m^2/g$ to 500 $m^2/g$, from about 200 $m^2/g$ to 2000 $m^2/g$, from about 200 $m^2/g$ to 1800 $m^2/g$, from about 200 $m^2/g$ to 1600 $m^2/g$, from about 200 $m^2/g$ to 1400 $m^2/g$, from about 200 $m^2/g$ to 1200 $m^2/g$, from about 200 $m^2/g$ to 1000 $m^2/g$, from about 200 $m^2/g$ to 800 $m^2/g$, from about 200 $m^2/g$ to 600 $m^2/g$, from about 200 $m^2/g$ to 500 $m^2/g$, from about 300 $m^2/g$ to 2000 $m^2/g$, from about 300 $m^2/g$ to 1800 $m^2/g$, from about 300 $m^2/g$ to 1600 $m^2/g$, from about 300 $m^2/g$ to 1400 $m^2/g$, from about 300 $m^2/g$ to 1200 $m^2/g$, from about 300 $m^2/g$ to 1000 $m^2/g$, from about 300 $m^2/g$ to 800 $m^2/g$, from about 300 $m^2/g$ to 600 $m^2/g$, from about 300 $m^2/g$ to 500 $m^2/g$, from about 200 $m^2/g$ to 500 $m^2/g$, from about 300 $m^2/g$ to 500 $m^2/g$, from about 400 $m^2/g$ to 500 $m^2/g$, or from about 600 m²/g to 800 m²/g. In some examples, the solid matrix material may be comprised of activated carbon, silica gel, activated alumina, molecular sieve zeolites, or a synthetic polymer or resin with non-limiting examples that include styrene, divinylbenzene, or acrylic esters. In some examples, the solid matrix material may be capable of adsorbing a species via non-ionic interactions (e.g., Van der Waals forces) and/or via ionic interactions. In some examples, an adsorption unit operation may be arranged as a fixed-bed, wherein the solid matrix material may be stationary or not stationary. In some examples, the adsorption unit may be arranged as an ion-exchange column. In some examples, systems of the disclosure may contain one or more adsorption unit operations that are consecutively staged or discontinuously staged. In some examples, systems of the disclosure may contain one or more adsorption unit operations that are staged in parallel. In some examples, an adsorption unit operation may be arranged upstream or downstream from a reactor or condenser. In some examples, an adsorption unit operation may be capable of being operated in batch mode or continuous mode.

Systems of the disclosure may include at least one separation unit operation that is a liquid-liquid extraction unit operation. In general, liquid-liquid extraction unit operations are capable of executing liquid-liquid extraction separation methods that may be useful in methods of the disclosure, for example, in further purifying a liquid stream, such as one that contains valuable lower molecular-weight hydrocarbons. In some examples, one or more of the liquids used is an organic solvent. A liquid-liquid extraction unit operation may be arranged as a mixer-settler apparatus, a plate and agitated tower contactor, a packed spray tower, or a spray extraction tower. In some examples, systems of the disclosure may contain one or more liquid-liquid extraction unit operations that are consecutively staged or discontinuously staged. In some examples, systems of the disclosure may contain one or more liquid-liquid extraction unit operations that are staged in parallel. In some examples, a liquid-liquid extraction unit operation may be arranged upstream or downstream from a reactor or condenser. In some examples, a liquid-liquid extraction unit operation may be capable of being operated in batch mode or continuous mode. In some examples, two or more liquids may be contacted via flow, wherein the liquids may be arranged in the liquid-liquid extraction unit to flow co-current to each other or counter-current to each other.

Systems of the disclosure may include at least one separation unit operation that is a membrane unit operation. In general, a membrane unit operation may be capable of executing membrane separation methods. In some examples, a membrane in a membrane unit operation may be comprised of, in whole or part, a porous polymer or a microporous solid. In some examples, a membrane may be comprised of, in whole or part, silicone rubber, polysulfone, cellulose acetate, aromatic polyamides, aromatic polyimides, and silicone-polycarbonate co-polymer. In some examples, a membrane unit operation may be arranged to separate out components from a gas. In some examples, a membrane unit operation may be arranged as a dialysis unit, wherein components may be removed from a liquid using a membrane. In some examples, wherein a membrane unit operation functions as a dialysis unit, a membrane may consist of one or more semi-permeable hollow-fibers. In some examples, a membrane unit operation may be arranged as a reverse osmosis unit, ultrafiltration unit, or as a gel permeation chromatography unit. In some examples, active mechanisms, such as, for example, force supplied by a pump may be used to transport mass across a membrane or passive mechanisms, such as, for example, concentration gradients may be used. In some examples, systems of the disclosure may contain one or more membrane unit operations that are consecutively staged or discontinuously staged. In some examples, systems of the disclosure may contain one or more membrane unit operations that are staged in parallel. In some examples, a membrane unit operation may be arranged upstream or downstream from a reactor or condenser. In some examples, a membrane unit operation may be capable of being operated in batch mode or continuous mode. In some examples, two or more fluids may be in mechanical contact with a membrane via flow, wherein the fluids are arranged to flow co-current to each other, counter-current to each other, or cross-current to each other.

Systems of the disclosure may include at least one separation unit operation that is a filtration unit operation. In general, a filtration unit operation may be capable of executing filtration separation methods that may be useful, for example, in filtering a waste plastic feedstock before the feedstock is directed to a reactor. In some examples, the filter media that is included in a filtration unit operation is comprised of cloth or a screen. In some examples, the filter media that is included in a filtration unit operation is comprised of twill cloth, duckweave heavy cloth, woolen cloth, glass cloth paper, felted pads of cellulose, metal cloth, nylon cloth, Darcon cloth, other synthetic cloths, and other heavy woven cloths. In some examples, a filter aid may be utilized as a filter media pre-coat or may be added to a liquid to be filtered in order to improve porosity of the resulting solid material cake that forms on the filter media. In some examples, a filter aid may be comprised of incompressible diatomaceous earth, kieselguhr, silica, wood cellulose, asbestos, or other inert porous solids. In some examples, a filtration unit operation may be arranged as a bed filter. In some examples, a filtration unit operation may be arranged as a plate-and-frame press filter, leaf filter, continuous rotary vacuum-drum filter, a continuous rotary disk filter, or a continuous rotary horizontal filter. In some examples, active mechanisms, such as, for example, force provided by a pump or centrifugation may be used to transport a liquid through a filter media that is included in a filtration unit operation or passive mechanisms, such as, for example, gravity may be used. In some examples, a filter cake that forms during filtration may contain materials that may be useful in other components of a system or may be useful as materials in other processes. In some examples, systems of the disclosure may contain one or more filtration unit operations that are consecutively staged or discontinuously staged. In some examples, systems of the disclosure may contain one or more filtration unit operations that are staged in parallel. In some examples, a filtration unit operation may be arranged upstream or downstream from a reactor or condenser. In some examples, a filtration unit operation may be capable of being operated in batch mode or continuous mode.

Systems of the disclosure may include at least one separation unit operation that is a sedimentation unit operation. In general, a sedimentation unit operation may be capable of executing sedimentation separation methods that may be useful, for example, for removing solid contaminants of liquid or gas streams or for removing solid materials formed from material precipitation during material processing. In some examples, a sedimentation unit operation may be arranged to separate solids from a gas or separate solids from a liquid. In some examples, a sedimentation unit operation may be arranged as a single settling vessel with non-limiting examples that include tanks, flasks, stills, pots, kettles, and beakers. In some examples, a settling unit operation may be arranged to have one or more receptacles designed to sort solid materials that may be sedimented. In some examples, a sedimentation unit operation may be arranged as a Spitzkasten classifier, a sedimentation thickener, a centrifugal sedimentation unit, or a gas-solid cyclone unit. In some examples, systems of the disclosure may contain one or more sedimentation unit operations that are consecutively staged or discontinuously staged. In some examples, systems of the disclosure may contain one or more sedimentation unit operations that are staged in parallel. In some examples, a sedimentation unit operation may be arranged upstream or downstream from a reactor or condenser. In some examples, a sedimentation unit operation may be arranged upstream from a reactor or condenser. In some examples, a sedimentation unit operation may be capable of being operated in batch mode or continuous mode.

Reactors used in systems of the disclosure rely on a heating source to induce thermal decomposition of a waste plastic feedstock. Moreover, other unit operations may also require a heating source. Non-limiting examples of sources of heat that may be included in systems of the disclosure include a heat transfer fluid, an electrical heater, or a flame. In some examples, a heat-exchanger may be included in systems of the disclosure with non-limiting examples that include shell and tube heat exchangers, plate heat exchangers, regenerative heat exchangers, recuperative heat exchangers, adiabatic wheel heat exchangers, plate fin heat exchangers, fluid heat exchangers, waste heat recovery units, dynamic scraped surface heat exchanger, phase-change heat exchangers, and spiral heat exchangers. A heating source may be in thermal contact with an outside surface of a unit operation (e.g., for example, in the case of a jacketed reactor that utilizes a heat transfer fluid in the jacket), or the heating source may be an internal component to a unit operation that may or may not be in mechanical contact with a material that is heated within the unit operation.

Systems of the disclosure may include one or more chemical additive storage vessels that may be capable of storing a chemical additive used in methods of the disclosure. In some examples, a chemical additive storage vessel may be capable of being held at ambient temperature or may be capable of being held at increased or reduced temperatures. Reduced temperature, for example, may be useful in reducing the rate of vaporization of any volatile chemical additives. Chemical additive storage vessels may be capable of being held at atmospheric pressure and/or may be capable of being pressurized in order to maximize the holding capacity of the contained materials. Non-limiting examples of vessels that may be capable of serving as chemical additive storage vessels that may be included in systems of the disclosure include silos, tanks, flasks, stills, pots, kettles, and beakers.

Systems of the disclosure may include one or more product storage vessels. Such product storage vessels may be useful in long-term product storage after final purification or sorting of various components recovered from methods of the disclosure. Product storage vessels may be capable of being held at ambient temperature or may be capable of being temperature controlled to prevent volatilization of the contained materials. Product storage vessels may be capable of being held at atmospheric pressure and/or may be capable of being pressurized in order to maximize the holding capacity of the contained materials. Non-limiting examples of vessels that may be capable of serving as product storage vessels that may be included in systems of the disclosure include silos, tanks, flasks, stills, pots, kettles, and beakers.

Systems of the disclosure may include one or more control systems to regulate aspects of the system. The control system may control any number of system operating parameters with non-limiting examples that include the rates at which materials are entered into various unit operations, the rates at which materials are consumed, the rates at which materials are generated, the rate at which materials are transported between unit operations, the rates at which materials leave a system, the temperature of any unit operation, the pressure of any unit operation, or heating rates of any material stream or unit operation. In some examples, a control system may be arranged with feedback control loops. Any combination of proportional, integral, and or derivative control schemes may be executed by a control system.

Systems of the disclosure may include sensors and/or control valves to aid in system control. Sensors may be capable of monitoring system parameters controlled by the control system. Non-limiting examples of sensors that may be included in systems of the disclosure include temperature sensors, pressure sensors, material flow meters, material concentration sensors, scales, fluid level indicators, or particle size sensors. Valves may be capable of exercising control of system parameters that may need adjusting during method execution, as indicated by an appropriate sensor. Non-limiting examples of valves that may be included in systems of the disclosure include pressure relief values, material flow valves, or heat transfer fluid control valves. Control valves may be capable of being operated manually by a chemical operator or may be automatically controllable by a control system.

Systems of the disclosure may include one or more conveyor belts. Conveyor belts may be useful for transporting materials between unit operations. In some examples, systems of the disclosure may contain one or more conveyor belts that are consecutively staged or discontinuously staged. In some examples, systems of the disclosure may contain one or more conveyor belts that are staged in parallel. In some examples, a conveyor belt may be capable of being operated in batch mode or continuous mode.

Systems of the disclosure may include one or more pumps. Pumps may be useful for transporting materials between unit operations. In some examples, systems of the disclosure may contain one or more pumps that are consecutively staged or discontinuously staged. In some examples, systems of the disclosure may contain one or more pumps that are staged in parallel. In some examples, a pump may be capable of being operated in batch mode or continuous mode.

Systems of the disclosure may include one or more piping systems. Piping systems may be useful for transporting materials between unit operations.

Systems of the disclosure may include one or more glass fittings that may be used to link various unit operations. Glass fittings may be useful for transporting materials between unit operations, especially in the case of laboratory-scale systems. An example of a glass-fitting is a glass connector, used to connect two pieces of glass equipment, such as, for example a glass reactor flask and a glass condenser.

Systems of the disclosure may include unit operations that may be pressurized. Pressurization may be achieved by putting a unit operation under vacuum during use. In some examples, a unit operation may be pressurized, such as with an inert gas, during use.

EXAMPLES

Example 1

A laboratory-scale production run in batch-mode is conducted wherein a 1 kg waste plastic feedstock is heated with 5% w/w (50 g) residue generated from previously heated waste plastic feedstock. The waste plastic feedstock is generated from random amounts of HDPE, LDPE, PP, and PS for a total weight of 1 kg. The residue is also generated from random amounts of HDPE, LDPE, PP, and PS for a total weight of 50 g. Moreover, the residue is not contained within the reactor prior to heating, and is, instead, entered from a separate heating process into a spherical glass reactor with the waste plastic feedstock to be heated. The spherical glass reactor is fluidly connected (via glass fittings) to a single-stage condenser that is operated with chilled tap water. The condenser is positioned with a negative slope (from its end fluidly connected with the reactor—similar to the condenser shown in FIG. 6) and fluidly connected (via glass fittings) to a product recovery flask. Such arrangement permits gravity transport of distillate generated during product vapor condensation. An external electrical heater (e.g., outside of the reactor) is used to heat the feedstock with the residue in the reactor for 310 minutes, with the set temperature of the heater at 0 min having a value of 150° C. The set temperature of the heater is ramped at a rate of +0.67° C./min for the first 225 minutes. At 225 minutes, the set temperature of the heater is 300° C. and the set temperature ramp rate is increased to a rate of +1.3° C./min until 300 minutes and a heater set temperature of 400° C. is reached. The set temperature of the heater is held at 400° C. for the remaining 10 minutes of the production run. A thermocouple is used to measure the temperature in the reactor. Observations of temperatures in the reactor and visual inspections of the process that are recorded for the production run are shown in Table 1.

TABLE 1

Temperatures and Observations of Example 1

| Timepoint (min) | Heater Set Temperature (° C.) | Reaction Mixture Temperature (° C.) | Observations |
|---|---|---|---|
| 0 | 150 | 23 | Waste-plastic feedstock is solid |
| 15 | 160 | 70 | Waste-plastic feedstock is solid |
| 30 | 170 | 165 | Waste-plastic feedstock is solid |
| 45 | 180 | 186 | Light vapor observable in collection flask |
| 60 | 190 | 202 | Drops of liquid distillate begin forming |
| 75 | 200 | 215 | Slow, steady drops of liquid distillate produced |
| 90 | 210 | 224 | Drop rate of liquid distillate formation faster |
| 105 | 220 | 231 | Drop rate of liquid distillate faster at ~120 drops/min |
| 120 | 230 | 238 | Waste-plastic feedstock boiling |
| 135 | 240 | 244 | Drop rate of liquid distillate faster |
| 150 | 250 | 259 | Drop rate of liquid distillate very fast |
| 165 | 260 | 268 | Vapor showing in collection flask |
| 180 | 270 | 275 | Sample at rolling boil and sustained drop rate of liquid distillate |
| 195 | 280 | 287 | Liquid distillate is transparent |
| 210 | 290 | 291 | Drop rate of liquid distillate continues to be sustained |
| 225 | 300 | 299 | Drop rate of liquid distillate continues to be sustained |
| 240 | 320 | 322 | Drop rate of liquid distillate continues to be sustained; distillate has color |
| 255 | 340 | 346 | Drop rate of liquid distillate ~92 drops/min |
| 270 | 360 | 371 | Drop rate of liquid distillate sustained |
| 285 | 380 | 382 | Distillate now appears to have light black color |
| 300 | 400 | 389 | Drop rate of liquid distillate slowing |
| 310 | 400 | 389 | Drop rate of liquid distillate slowing |

At the conclusion of the production run (e.g., 310 minutes), the liquid distillate that is collected from condensation is massed and its volume taken. A distillate weight of 817.4 g is recorded, having a volume of 1020 mL. A density of the distillate is calculated as the ratio of mass recorded from weighing the distillate to the measured volume of the distillate. A density of 0.80 g/mL is recorded for the distillate. A mass conversion (mass conversion=(mass of distillate/mass of waste plastic feedstock entered into the reactor)×100%) is also calculated for the production process, with a value of 81.74%. The distillate is observed to be dark yellow in color and ignites during a flame test. A summary of the experimental results of Example 1 is shown in Table 5.

Example 2

A laboratory-scale production run in batch-mode is conducted wherein a 1 kg waste plastic feedstock is heated with 10% w/w (100 g) residue generated from previously heated waste plastic feedstock. The waste plastic feedstock is generated from random amounts of HDPE, LDPE, PP, and PS for a total weight of 1 kg. The residue is also generated from random amounts HDPE, LDPE, PP, and PS for a total weight of 100 g. Moreover, the residue is not contained within the reactor prior to heating, and is, instead, entered from a separate heating process into a spherical glass reactor with the waste plastic feedstock to be heated. The spherical glass reactor is fluidly connected (via glass fittings) to a single-stage condenser that is operated with chilled tap water. The condenser is positioned with a negative slope (from its end fluidly connected with the reactor—similar to the condenser shown in FIG. 6) and fluidly connected (via glass fittings) to a product recovery flask. Such arrangement permits gravity transport of distillate generated during product vapor condensation. An external electrical heater (e.g., outside of the reactor) is used to heat the feedstock with the residue in the reactor for 300 minutes, with the set temperature of the heater at 0 min having a value of 150° C. The set temperature of the heater is ramped at a rate of +0.67° C./min for the first 225 minutes. At 225 minutes, the set temperature of the heater is 300° C. and the set temperature ramp rate is increased to a rate of +1.3° C./min until 300 minutes and a heater set temperature of 400° C. is reached. The production run is concluded at 300 minutes. A thermocouple is used to measure the temperature in the reactor. Observations of temperatures in the reactor and visual inspections of the process that are recorded for the production run are shown in Table 2.

TABLE 2

Temperatures and Observations of Example 2

| Timepoint (min) | Heater Set Temperature (° C.) | Reaction Mixture Temperature (° C.) | Observations |
|---|---|---|---|
| 0 | 150 | 22 | Waste-plastic feedstock is solid |
| 15 | 160 | 69 | Waste-plastic feedstock is solid |
| 30 | 170 | 150 | Light vapor observable in collection flask |
| 45 | 180 | 192 | Waste-plastic feedstock melting |
| 60 | 190 | 232 | First drop of liquid distillate observed |
| 75 | 200 | 238 | Drop rate of liquid distillate slow |
| 90 | 210 | 243 | Clear colored liquid distillate observed |
| 105 | 220 | 249 | Drop rate of liquid distillate of ~97 drops/min |
| 120 | 230 | 255 | Melted waste-plastic feedstock boiling |
| 135 | 240 | 258 | Drop rate of liquid distillate fast |
| 150 | 250 | 261 | Drop rate of liquid distillate slows some |
| 165 | 260 | 267 | Drop rate of liquid distillate at ~88 drops/min |
| 180 | 270 | 272 | Drop rate of liquid distillate speeds up |
| 195 | 280 | 281 | Some vapor observed in collection flask |
| 210 | 290 | 288 | Clear colored liquid distillate observed |
| 225 | 300 | 297 | Drop rate of liquid distillate of ~77 drops/min |
| 240 | 320 | 312 | Drop rate of liquid distillate sustained |
| 255 | 340 | 326 | Drop rate of liquid distillate sustained |
| 270 | 360 | 348 | Distillate now appears to have light black color |
| 285 | 380 | 367 | Drop rate of liquid distillate slows considerably |
| 300 | 400 | 388 | No additional production of liquid distillate |

At the conclusion of the production run (e.g., 300 minutes), the liquid distillate that is collected from condensation is massed and its volume taken. A distillate weight of 821 g is recorded, having a volume of 1038 mL. A density of the distillate is calculated as the ratio of mass recorded from weighing the distillate to the measured volume of the distillate. A density of 0.79 g/mL is recorded for the distillate. A mass conversion is also calculated for the production process, with a value of 82.1%. The distillate is observed to be dark yellow in color and ignites during a flame test.

A summary of the experimental results of Example 2 is shown in Table 5.

Example 3

A laboratory-scale production run in batch-mode is conducted wherein a 1 kg waste plastic feedstock is heated with 20% w/w (200 g) residue generated from previously heated waste plastic feedstock. The waste plastic feedstock is generated from random amounts of HDPE, LDPE, PP, and PS for a total weight of 1 kg. The residue is also generated from random amounts HDPE, LDPE, PP, and PS for a total weight of 200 g. Moreover, the residue is not contained within the reactor prior to heating, and is, instead, entered from a separate heating process into a spherical glass reactor with the waste plastic feedstock to be heated. The spherical glass reactor is fluidly connected (via glass fittings) to a single-stage condenser that is operated with chilled tap water. The condenser is positioned with a negative slope (from its end fluidly connected with the reactor—similar to the condenser shown in FIG. 6) and fluidly connected (via glass fittings) to a product recovery flask. Such arrangement permits gravity transport of distillate generated during product vapor condensation. An external electrical heater (e.g., outside of the reactor) is used to heat the feedstock with the residue in the reactor for 270 minutes, with the set temperature of the heater at 0 min having a value of 200° C. The set temperature of the heater is ramped at a rate of +0.67° C./min for the first 165 minutes. At 165 minutes, the set temperature of the heater is 310° C. and the set temperature ramp rate is increased to a rate of +1.3° C./min until 240 minutes and a heater set temperature of 400° C. is reached. The set temperature is held at 400° C. for 15 additional minutes to reach 255 minutes. At 255 minutes, the temperature is further ramped at a rate of +0.67° C. to a temperature of 410° C., achieved at 270 minutes. At 270 minutes the production run concludes. A thermocouple is used to measure the temperature in the reactor. Observations of temperatures in the reactor and visual inspections of the process that are recorded for the production run are shown in Table 3.

TABLE 3

Temperatures and Observations of Example 3

| Timepoint (min) | Heater Set Temperature (° C.) | Reaction Mixture Temperature (° C.) | Observations |
|---|---|---|---|
| 0 | 200 | 23 | Waste-plastic feedstock is solid |
| 15 | 210 | 72 | Light vapor observable in collection flask |
| 30 | 220 | 152 | Waste-plastic feedstock melting |
| 45 | 230 | 198 | First drop of liquid distillate observed |
| 60 | 240 | 242 | Drop rate of liquid distillate slow |
| 75 | 250 | 248 | Clear colored liquid distillate observed |
| 90 | 260 | 257 | Drop rate of liquid distillate of ~76 drops/min |
| 105 | 270 | 264 | Melted waste-plastic feedstock boiling |
| 120 | 280 | 278 | Drop rate of liquid distillate fast |
| 135 | 290 | 286 | Drop rate of liquid distillate slows some |
| 150 | 300 | 293 | Drop rate of liquid distillate at ~92 drops/min |
| 165 | 310 | 305 | Drop rate of liquid distillate speeds up |
| 180 | 330 | 320 | Clear colored liquid distillate observed |
| 195 | 350 | 339 | Waste-plastic feedstock at rolling boil |

TABLE 3-continued

Temperatures and Observations of Example 3

| Timepoint (min) | Heater Set Temperature (° C.) | Reaction Mixture Temperature (° C.) | Observations |
|---|---|---|---|
| 210 | 370 | 355 | Drop rate of liquid distillate sustained |
| 225 | 390 | 373 | Distillate now appears to have light black color |
| 240 | 400 | 385 | Drop rate of liquid distillate slows some; white vapor |
| 255 | 400 | 387 | Drop rate of liquid distillate slows more |
| 270 | 410 | 389 | No additional production of liquid distillate |

At the conclusion of the production run (e.g., 270 minutes), the liquid distillate that is collected from condensation is massed and its volume taken. A distillate weight of 816.13 g is recorded, having a volume of 1030 mL. A density of the distillate is calculated as the ratio of mass recorded from weighing the distillate to the measured volume of the distillate. A density of 0.79 g/mL is recorded for the distillate. A mass conversion is also calculated for the production process, with a value of 81.61%. The distillate is observed to be dark yellow in color and ignites during a flame test. A summary of the experimental results of Example 3 is shown in Table 5.

Example 4

High-density polyethylene (HDPE) waste plastic is collected and cleaned manually with soap and water. The waste plastic is then first cut into small pieces (approximately 5-6 in$^2$ in area) using scissors. A secondary size-reduction modality is utilized with the scissor-cut waste plastic further ground, using a grinder, to produce a waste plastic feedstock of comprised of waste plastic pieces about 3-4 mm in diameter. A laboratory-scale, batch-mode process is employed with 750 g of the ground waste plastic feedstock entered into a reactor that contains adhered residue from a previously heated feedstock. No additional external catalyst is added to the system. The reactor is heated using an electrical heater with an initial heater set temperature of 100° C. and ramped continuously to a final heater set temperature of 420° C., over the course of 5-6 hours.

Throughout the course of increased heating, the waste plastic feedstock melts, with subsequent volatilization of lower molecular-weight hydrocarbons into a vapor stream. Between 260-340° C., a substantial vapor stream is generated. This vapor stream is directed to pass through a fractional distillation column for separation into its component hydrocarbons. A mixture of hydrocarbons that have lower carbon-chain lengths ("light fuel"), and, thus, generally lower boiling temperatures ("light fuel") are collected at the top of the fractional distillation column and a mixture of longer carbon-chain heavier hydrocarbons ("heavy fuel") are collected from the bottom of the fractional distillation column. Light fuel is passed through an alkali-containing scrubber to remove contaminants and then transferred into a Teflon bag for further analysis. Collected liquid heavy fuel is further purified using centrifugal and filtration devices.

Light fuel is determined to contain methane, ethane, propane, and butane due to the very low boiling points of these species. Produced liquid heavy fuel has a weight of 135 g and a volume of 160 mL to give a density of 0.84 g/ml.

A mass-conversion of heavy fuel generated by the vapor stream obtained from heating temperatures 260-340° C. is determined to be 18%. 562.5 g of fuel was obtained at other temperatures of the heating ramp (i.e., temperatures outside the range 260-340° C.), for a total mass-conversion of 75%. By mass, 30 g of light fuel was generated for a mass-conversion of 4%. The total mass-conversion (e.g., light fuel+heavy fuel+fuel obtained at temperatures outside 260-340° C.) for the process is 97%. The heavy fuel fraction that is obtained is further separated with gas chromatography and detected with a mass spectrometer, to determine the component hydrocarbons of the heavy fuel mixture. Gas chromatograph is set at an initial temperature of 40° C. and a final temperature of 325° C., with a heating rate of 0.67° C./min and held at the final temperature for 15 min. Mass spectrometer is set to detect eluting species with mass-to-charge ratio (m/z) of 35.00-528.00, with a solvent delay of 1 min. Standards of hydrocarbons in the $C_5$-$C_{28}$ range are used for determinations. A total of 36 distinct species are identified and summarized, with retention time and molecular-weight in Table 4.

TABLE 4

GC/MS Analysis of hydrocarbon components in collected heavy fuel from temperature 260° C. to 340° C.

| Peak Number | Retention Time (min) | Compound Name | Compound Formula | Molecular Weight |
|---|---|---|---|---|
| 1 | 1.89 | Cyclopropane, ethyl- | $C_5H_{10}$ | 70 |
| 2 | 1.93 | Pentane | $C_5H_{12}$ | 72 |
| 3 | 2.51 | 1-Hexene | $C_6H_{12}$ | 84 |
| 4 | 2.58 | Hexane | $C_6H_{14}$ | 86 |
| 5 | 3.63 | 1-Heptene | $C_7H_{14}$ | 98 |
| 6 | 3.75 | Heptane | $C_7H_{16}$ | 100 |
| 7 | 5.17 | 1-Octene | $C_8H_{16}$ | 112 |
| 8 | 5.33 | Octane | $C_8H_{18}$ | 114 |
| 9 | 6.90 | 1-Nonene | $C_9H_{18}$ | 126 |
| 10 | 7.06 | Nonane | $C_9H_{20}$ | 128 |
| 11 | 8.63 | 1-Decene | $C_{10}H_{20}$ | 140 |
| 12 | 8.78 | Decane | $C_{10}H_{22}$ | 142 |
| 13 | 10.29 | 1-Undecene | $C_{11}H_{22}$ | 154 |
| 14 | 10.43 | Undecane | $C_{11}H_{24}$ | 156 |
| 15 | 11.85 | 1-Dodecene | $C_{12}H_{24}$ | 168 |
| 16 | 11.98 | Dodecane | $C_{12}H_{26}$ | 170 |
| 17 | 13.32 | 1-Tridecene | $C_{13}H_{26}$ | 182 |
| 18 | 13.43 | Tridecane | $C_{10}H_{28}$ | 184 |
| 19 | 14.70 | 1-Tetradecene | $C_{14}H_{28}$ | 196 |
| 20 | 14.81 | Tetradecane | $C_{14}H_{30}$ | 198 |
| 21 | 16.01 | 1-Pentadecene | $C_{15}H_{30}$ | 210 |
| 22 | 16.11 | Pentadecane | $C_{15}H_{32}$ | 212 |
| 23 | 17.26 | 1-Hexadecene | $C_{16}H_{32}$ | 224 |
| 24 | 17.36 | Hexadecane | $C_{16}H_{34}$ | 226 |
| 25 | 18.46 | 3-Heptadecene, (Z)- | $C_{17}H_{34}$ | 238 |
| 26 | 18.56 | Heptadecane | $C_{17}H_{36}$ | 240 |
| 27 | 19.62 | 1-Eicosene | $C_{20}H_{40}$ | 280 |
| 28 | 19.73 | Octadecane | $C_{18}H_{38}$ | 254 |
| 29 | 20.87 | Eicosane | $C_{20}H_{42}$ | 282 |
| 30 | 21.63 | 1-Docosanol | $C_{22}H_{46}O$ | 326 |
| 31 | 22.05 | Eicosane | $C_{20}H_{42}$ | 282 |
| 32 | 23.27 | Heneicosane | $C_{21}H_{44}$ | 296 |
| 33 | 24.63 | Octacosane | $C_{28}H_{58}$ | 394 |
| 34 | 26.20 | Octacosane | $C_{28}H_{58}$ | 394 |
| 35 | 28.11 | Tetracosane | $C_{24}H_{50}$ | 338 |
| 36 | 30.62 | Heptacosane | $C_{27}H_{56}$ | 380 |

Example 5

A laboratory-scale production run in batch-mode is conducted wherein 75 g of computer body are heated with 7.5 g of zinc oxide and 7.5 g of activated carbon in a spherical glass reactor also comprising residue produced from a previously heated source of waste plastic. The spherical glass reactor is fluidly connected (via glass fittings) to a single-stage condenser that is operated with chilled tap water. The condenser is positioned with a negative slope (from its end fluidly connected with the reactor—similar to the condenser shown in FIG. 6) and fluidly connected (via glass fittings) to a product recovery flask. Such arrangement permits gravity transport of distillate generated during product vapor condensation. An external electrical heater (e.g., outside of the reactor) is used to heat the feedstock with the residue in the reactor for 310 minutes, with the set temperature of the heater at 0 min having a value of 150° C. The set temperature of the heater is ramped at a rate of +0.67° C./min for the first 225 minutes. At 225 minutes, the set temperature of the heater is 300° C. and the set temperature ramp rate is increased to a rate of +1.3° C./min until 300 minutes and a heater set temperature of 400° C. is reached. The set temperature of the heater is held at 400° C. for the remaining 10 minutes of the production run. A thermocouple is used to measure the temperature in the reactor.

At the conclusion of the production run (e.g., 310 minutes), the liquid distillate that is collected from condensation is massed and its volume taken. A distillate weight of 55.7 g is recorded, having a volume of 63 mL. A density of the distillate is calculated as the ratio of mass recorded from weighing the distillate to the measured volume of the distillate. A density of 0.88 g/mL is recorded for the distillate. A mass conversion (mass conversion=(mass of distillate/mass of waste plastic feedstock entered into the reactor)×100%) is also calculated for the production process, with a value of 74.26%. The distillate is observed to be dark yellow in color and ignites during a flame test.

Example 6

A laboratory-scale production run in batch-mode is conducted wherein 100 g of scrap tires are heated with 1 g of ferric carbonate in a spherical glass reactor also comprising residue produced from a previously heated source of waste plastic. The spherical glass reactor is fluidly connected (via glass fittings) to a single-stage condenser that is operated with chilled tap water. The condenser is positioned with a negative slope (from its end fluidly connected with the reactor—similar to the condenser shown in FIG. 6) and fluidly connected (via glass fittings) to a product recovery flask. Such arrangement permits gravity transport of distillate generated during product vapor condensation. An external electrical heater (e.g., outside of the reactor) is used to heat the feedstock with the residue in the reactor for 310 minutes, with the set temperature of the heater at 0 min having a value of 150° C. The set temperature of the heater is ramped at a rate of +0.67° C./min for the first 225 minutes. At 225 minutes, the set temperature of the heater is 300° C. and the set temperature ramp rate is increased to a rate of +1.3° C./min until 300 minutes and a heater set temperature of 400° C. is reached. The set temperature of the heater is held at 400° C. for the remaining 10 minutes of the production run. A thermocouple is used to measure the temperature in the reactor.

At the conclusion of the production run (e.g., 310 minutes), the liquid distillate that is collected from condensation is massed and its volume taken. A distillate weight of 21.1 g is recorded, having a volume of 25 mL. A density of the distillate is calculated as the ratio of mass recorded from weighing the distillate to the measured volume of the distillate. A density of 0.84 g/mL is recorded for the distillate. A mass conversion (mass conversion=(mass of distillate/mass of waste plastic feedstock entered into the reactor)×100%) is also calculated for the production process, with a value of 21.1%. The distillate is observed to be dark yellow in color and ignites during a flame test.

Example 7

A laboratory-scale production run in batch-mode is conducted wherein 75 g of scrap electrical cable (e.g., comprising an electrical cable casing) are heated with 3.75 g of sodium hydroxide and 3.75 g of activated carbon in a spherical glass reactor also comprising residue produced from a previously heated source of waste plastic. The spherical glass reactor is fluidly connected (via glass fittings) to a single-stage condenser that is operated with chilled tap water. The condenser is positioned with a negative slope (from its end fluidly connected with the reactor—similar to the condenser shown in FIG. 6) and fluidly connected (via glass fittings) to a product recovery flask. Such arrangement permits gravity transport of distillate generated during product vapor condensation. An external electrical heater (e.g., outside of the reactor) is used to heat the feedstock with the residue in the reactor for 310 minutes, with the set temperature of the heater at 0 min having a value of 150° C. The set temperature of the heater is ramped at a rate of +0.67° C./min for the first 225 minutes. At 225 minutes, the set temperature of the heater is 300° C. and the set temperature ramp rate is increased to a rate of +1.3° C./min until 300 minutes and a heater set temperature of 400° C. is reached. The set temperature of the heater is held at 400° C. for the remaining 10 minutes of the production run. A thermocouple is used to measure the temperature in the reactor.

At the conclusion of the production run (e.g., 310 minutes), the liquid distillate that is collected from condensation is massed and its volume taken. A distillate weight of 25.2 g is recorded, having a volume of 28 mL. A density of the distillate is calculated as the ratio of mass recorded from weighing the distillate to the measured volume of the distillate. A density of 0.90 g/mL is recorded for the distillate. A mass conversion (mass conversion=(mass of distillate/mass of waste plastic feedstock entered into the reactor)×100%) is also calculated for the production process, with a value of 33.6%. The distillate is observed to be dark yellow in color and ignites during a flame test.

TABLE 5

Experimental results of production runs in Example 1, Example 2, Example 3, Example 5, Example 6, and Example 7.

| Example (#) | Reaction Time (min) | Weight of Waste Plastic Feedstock (g) | Weight Fraction of Added Residue (%) | Initial Heater Set Temperature (° C.) | Final Heater Set Temperature (° C.) | Total Liquid Distillate Volume (mL) | Total Liquid Distillate Mass (g) | Liquid Distillate Density (g/mL) | Mass Conversion (%) | Ignition? (YES/NO) |
|---|---|---|---|---|---|---|---|---|---|---|
| 1 | 310 | 1000 | 5 | 150 | 400 | 1020 | 817.4 | 0.80 | 81.74 | YES |
| 2 | 300 | 1000 | 10 | 150 | 400 | 1038 | 821 | 0.79 | 82.1 | YES |

TABLE 5-continued

Experimental results of production runs in Example 1, Example 2, Example 3, Example 5, Example 6, and Example 7.

| Example (#) | Reaction Time (min) | Weight of Waste Plastic Feedstock (g) | Weight Fraction of Added Residue (%) | Initial Heater Set Temperature (° C.) | Final Heater Set Temperature (° C.) | Total Liquid Distillate Volume (mL) | Total Liquid Distillate Mass (g) | Liquid Distillate Density (g/mL) | Mass Conversion (%) | Ignition? (YES/NO) |
|---|---|---|---|---|---|---|---|---|---|---|
| 3 | 270 | 1000 | 20 | 200 | 410 | 1030 | 816.13 | 0.79 | 81.61 | YES |
| 5 | 310 | 75 | 0 | 150 | 400 | 63 | 55.7 | 0.88 | 74.26 | YES |
| 6 | 310 | 100 | 0 | 150 | 400 | 25 | 21.1 | 0.84 | 21.10 | YES |
| 7 | 310 | 75 | 0 | 150 | 400 | 28 | 25.2 | 0.90 | 33.60 | YES |

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A system for producing a hydrocarbon-containing vapor stream from waste plastic, comprising:
   a reactor comprising a heater;
   a condenser unit fluidly connected to said reactor, wherein said condenser unit is configured to condense a vapor stream containing one or more chemical components from said reactor into one or more liquid streams, wherein said condenser unit is fluidly connected to said reactor via a pipe, wherein a segment of said pipe is in operable communication with a water cooling system configured to cool said segment of said pipe; and
   a controller configured to use said heater to maintain a temperature of said reactor to a preset cracking temperature or temperature range to yield said one or more chemical components,
   wherein said reactor comprises a residue produced from a previously heated plastic feedstock, said residue comprising a calcium to sodium mass ratio from about 0.0001 to 400, as measured by inductively-coupled plasma (ICP) spectrometry.

2. The system of claim 1, wherein said reactor is a single reactor.

3. The system of claim 1, wherein said condenser unit is a single condenser unit.

4. The system of claim 1, further comprising a separator unit configured to separate said one or more chemical components.

5. The system of claim 1, further comprising a storage tank configured to store said one or more chemical components.

6. The system of claim 1, wherein said reactor comprises an access port configured to allow said waste plastic to be loaded into said reactor.

7. The system of claim 6, wherein said access port is configured to accept a loading hopper to allow said waste plastic to be loaded into said reactor.

8. The system of claim 1, wherein said pipe comprises a first end coupled to said reactor with a first connector and a second end coupled to said condenser unit with a second connector.

9. The system of claim 8, wherein said first and second connectors comprise glass fittings.

10. The system of claim 1, wherein said water cooling system further comprises a water jacket coupled to said segment of said pipe.

11. A method for producing a hydrocarbon-containing vapor stream from waste plastic, comprising:
   (a) using a controller to (i) control a heater to maintain a preset cracking temperature or temperature range of a reactor to yield one or more chemical components; and (ii) control a condenser unit to condense a vapor stream containing said one or more chemical components into one or more liquid streams, wherein said condenser unit is fluidly connected to said reactor via a pipe; and
   (b) cooling a segment of said pipe with a water cooling system in operable communication with said segment of said pipe;
   wherein said reactor comprises a residue produced from a previously heated plastic feedstock, said residue comprising a calcium to sodium mass ratio from about 0.0001 to 400, as measured by inductively-coupled plasma (ICP) spectrometry.

12. The method of claim 11, further comprising separating said one or more chemical components using a separator unit.

13. The method of claim 11, further comprising storing said one or more chemical components in a storage tank.

14. The method of claim 11, further comprising loading said waste plastic into said reactor through an access port of said reactor.

15. The system of claim 1, further comprising a power supply coupled to said heater and configured to supply power to said heater, and a power supply monitor configured to monitor said power supplied to said heater.

16. The system of claim 1, further comprising a pressure gage configured to monitor a pressure within said reactor, and a control valve configured to maintain or regulate said pressure within said reactor.

17. The method of claim 14, wherein loading said waste plastic into said reactor comprises accepting a loading hopper with said access port.

18. The method of claim 11, wherein said reactor is a single reactor.

19. The method of claim 11, wherein said condenser unit is a single condenser unit.

20. The method of claim 11, wherein said pipe comprises a first end coupled to said reactor with a first connector and a second end coupled to said condenser unit with a second connector.

21. The method of claim 20, wherein said first and second connectors comprise glass fittings.

22. The method of claim 11, wherein said water cooling system further comprises a water jacket coupled to said segment of said pipe.

23. The method of claim 11, further comprising supplying power to said heater using a power supply coupled to said heater, and monitoring said power supplied to said heater using a power supply monitor.

24. The method of claim 11, further comprising monitoring a pressure within said reactor using a pressure gage, and maintaining or regulating said pressure within said reactor using a control valve.

* * * * *